(12) United States Patent
Jiang et al.

(10) Patent No.: US 12,147,813 B2
(45) Date of Patent: Nov. 19, 2024

(54) METHOD FOR HANDLING EXCEPTION OR INTERRUPT IN HETEROGENEOUS INSTRUCTION SET ARCHITECTURE AND APPARATUS

(71) Applicant: HUAWEI TECHNOLOGIES CO., LTD., Guangdong (CN)

(72) Inventors: Yifei Jiang, Hangzhou (CN); Siqi Zhao, Shenzhen (CN); Bo Wan, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 18/064,543

(22) Filed: Dec. 12, 2022

(65) Prior Publication Data

US 2023/0124004 A1   Apr. 20, 2023

Related U.S. Application Data

(63) Continuation of application No. PCT/CN2021/096075, filed on May 26, 2021.

(30) Foreign Application Priority Data

Jun. 12, 2020   (CN) .................. 202010539884.3

(51) Int. Cl.
*G06F 9/30* (2018.01)
*G06F 9/38* (2018.01)
(Continued)

(52) U.S. Cl.
CPC .......... *G06F 9/3865* (2013.01); *G06F 9/3861* (2013.01); *G06F 9/45558* (2013.01); *G06F 9/4818* (2013.01); *G06F 2009/45591* (2013.01)

(58) Field of Classification Search
CPC .. G06F 9/3865; G06F 9/3861; G06F 9/45558; G06F 9/4818; G06F 2009/45591
See application file for complete search history.

(56) References Cited

U.S. PATENT DOCUMENTS 5,854,913 A    12/1998  Goetz et al.
6,075,938 A     6/2000  Bugnion et al.
(Continued)

FOREIGN PATENT DOCUMENTS

CN    101454753 A    6/2009
CN    101663644 A    3/2010
(Continued)

OTHER PUBLICATIONS

International Search Report and Written Opinion in International Appln. No. PCT/CN2021/096075, mailed on Jul. 28, 2021, 21 pages (with English translation).

(Continued)

*Primary Examiner* — Corey S Faherty
(74) *Attorney, Agent, or Firm* — Fish & Richardson P.C.

(57) ABSTRACT

A method for handling an exception or interrupt in a heterogeneous instruction set architecture is provided. A physical host to which the method is applied can support two instruction set architectures. When a secondary architecture virtual machine triggers an exception or interrupt, a virtual machine monitor may translate code of the exception or interrupt in a secondary instruction set architecture into code of the exception or interrupt in a primary instruction set architecture. The virtual machine monitor) may identify the code of the exception or interrupt in the primary instruction set architecture. The virtual machine monitor identifies, based on the translated code, a type of the exception or interrupt triggered by the secondary architecture virtual machine, to handle the exception or interrupt.

16 Claims, 10 Drawing Sheets

(51) Int. Cl.
    *G06F 9/455*     (2018.01)
    *G06F 9/48*     (2006.01)

(56) References Cited

U.S. PATENT DOCUMENTS

| | | | |
|---|---|---|---|
| 2002/0013892 A1* | 1/2002 | Gorishek, IV | G06F 9/3879 |
| | | | 712/34 |
| 2008/0005546 A1* | 1/2008 | Wang | G06F 9/3879 |
| | | | 712/244 |
| 2008/0263342 A1* | 10/2008 | Knowles | G06F 11/0772 |
| | | | 712/244 |
| 2008/0294883 A1* | 11/2008 | Yajaman | G06F 9/4812 |
| | | | 712/244 |
| 2010/0153690 A1 | 6/2010 | Vick et al. | |
| 2012/0260064 A1 | 10/2012 | Henry et al. | |
| 2013/0145375 A1* | 6/2013 | Kang | G06F 9/5055 |
| | | | 718/104 |
| 2018/0107489 A1* | 4/2018 | Gao | G06F 9/30174 |
| 2019/0042258 A1 | 2/2019 | Opferman et al. | |

FOREIGN PATENT DOCUMENTS

| | | |
|---|---|---|
| CN | 102918516 A | 2/2013 |
| CN | 103038749 A | 4/2013 |

OTHER PUBLICATIONS

Extended European Search Report in European Appln No. 21822232.1, dated Sep. 19, 2023, 9 pages.

\* cited by examiner

METHOD FOR HANDLING EXCEPTION OR INTERRUPT IN HETEROGENEOUS INSTRUCTION SET ARCHITECTURE AND APPARATUS

CROSS-REFERENCE TO RELATED APPLICATIONS

This application is a continuation of International Application No. PCT/CN2021/096075, filed on May 26, 2021, which claims priority to Chinese Patent Application No. 202010539884.3, filed on Jun. 12, 2020. The disclosures of the aforementioned applications are hereby incorporated by reference in their entireties.

TECHNICAL FIELD

This application relates to the computer field, and in particular, to a method for handling an exception or interrupt.

BACKGROUND

An instruction set is a set of instructions that are stored in a processor and that are used to instruct the processor to perform addition and subtraction and control a computer operating system. The instruction set or an instruction set architecture is also a set of instructions that can be supported by a processor. Currently, common instruction set architectures (instruction set architecture, ISA) include an x86 architecture, an advanced reduced instruction set computing machine (advanced risc machine, ARM) architecture, a RISC-V architecture, and the like. Different processors may support different instruction set architectures. When a processor needs to support a new instruction set architecture, a hardware circuit needs to be modified. When software needs to support a new instruction set, a program needs to be modified and recompiled. When a service needs to be performed in a new instruction set architecture, an application and an operating system that support an original instruction set architecture cannot directly run on a processor that supports the new instruction set architecture, and need to be redeveloped to support the new instruction set architecture. For example, a binary file of software in the x86 instruction set architecture cannot be directly run in a hardware or software environment that supports the ARM instruction set architecture, and needs to be redeveloped and compiled based on the ARM instruction set architecture to obtain a new binary file of the software.

In a virtualization scenario, if a virtual machine that supports the ARM architecture needs to be started on a server, but both a virtualization platform running on the server and a virtual machine running on the virtualization platform support the x86 architecture, the virtualization platform that supports the x86 architecture needs to be replaced with a virtualization platform that supports the ARM architecture. Then, a virtual machine that supports the ARM architecture is started on the virtualization platform that supports the ARM architecture. In addition, a hardware device, including a processor, on the server needs to be replaced with a hardware device that supports the ARM architecture. Replacing an entire set of hardware and software is costly, and is not conducive to building a diversified software ecosystem.

To run a plurality of virtual machines that support different instruction set architectures on a virtualization platform that supports one instruction set architecture and build a diversified software ecosystem, instructions of a virtual machine that supports a heterogeneous instruction set architecture need to be executed or processed, especially when an exception or interrupt occurs. The virtual machine that supports a heterogeneous instruction set architecture and the virtualization platform respectively support different instruction set architectures. However, the virtualization platform can only identify an exception or interrupt triggered in the instruction set architecture supported by the virtualization platform. Therefore, an exception or interrupt triggered in the heterogeneous instruction set architecture cannot be properly identified or processed, causing a system crash.

SUMMARY

This application provides a method for handling an exception or interrupt, applied to a physical host that supports a heterogeneous instruction set virtual machine. This can handle an exception or interrupt triggered by the heterogeneous instruction set virtual machine and improves system stability.

According to a first aspect, an embodiment of this application provides a method for handling an exception. The method is applied to a physical host supporting a heterogeneous instruction set virtual machine, and a heterogeneous instruction set architecture includes at least two different instruction set architectures: a primary instruction set architecture and a secondary instruction set architecture, for example, a RISC-V architecture and an ARM architecture mentioned in this embodiment of this application. In other words, virtual machines support different instruction set architectures, such as a primary architecture virtual machine (for example, an ARM virtual machine) and a secondary architecture virtual machine (for example, a RISC-V virtual machine), may run on the physical host. A processor of the physical host includes a primary processor core supporting a primary instruction set architecture and a secondary processor core supporting a secondary instruction set architecture. The primary processor core and the secondary processor core are logical cores that are in the processor and that support different instruction set architectures. The logical core is a processing unit obtained through logical division from a physical core. In this embodiment of this application, the processor core is also referred to as processing logic. The method includes:

when the secondary architecture virtual machine triggers an exception or interrupt, obtaining status information of the exception or interrupt, where the status information of the exception or interrupt is first code of the exception or interrupt, the first code indicates a type of the exception or interrupt in the secondary instruction set architecture, and the first code indicates a type of the exception or interrupt in a specification of the secondary instruction set architecture; obtaining second code of the exception or interrupt triggered by the secondary architecture virtual machine from an exception mapping relationship or interrupt mapping relationship, and identify a type of the exception or interrupt triggered by the secondary architecture virtual machine based on the second code of the exception or interrupt, to handle the exception or interrupt.

In different instruction set architectures, codes of a same type of exception or interrupt are different. In different instruction set architectures, different codes may indicate a same type of exception or interrupt. A difference in codes may include different formats and different code values. In other words, the difference in codes may lie in different quantities of fields included in the codes and different values of the fields. In the specification of the secondary instruction set architecture, the type of the exception or interrupt triggered by the secondary architecture virtual machine is indicated by the first code. In a specification of the primary instruction set architecture, the type of the exception or interrupt is indicated by the second code. The first code is different from the second code. The exception mapping relationship and interrupt mapping relationship may be stored in storage space (for example, a memory) that can be accessed by a primary architecture virtual machine monitor. The exception mapping relationship records a correspondence between first code and second code of each type of exception among a plurality of types of exceptions. The correspondence indicates a correspondence between a type of the exception in the primary instruction set architecture and a type of the exception in the secondary instruction set architecture. For example, any one of the correspondence may indicate second code in the specification of the primary instruction set architecture and first code in the specification of the secondary instruction set architecture of an exception of a same type or a similar type. The interrupt mapping relationship records a correspondence between first code and second code of each type of interrupt among a plurality of types of interrupts. The correspondence indicates a correspondence between a type of the interrupt in the primary instruction set architecture and a type of the interrupt in the secondary instruction set architecture. For example, any one of the correspondence may indicate second code in the specification of the primary instruction set architecture and first code in the specification of the secondary instruction set architecture of an interrupt of a same type or a similar type. The interrupt triggered by the secondary architecture virtual machine may include a physical interrupt received by the secondary processor core and a virtual interrupt received by a virtual processor of the secondary architecture virtual machine.

The method according to any one of the first aspect and the following implementations of the first aspect may be performed by a virtual machine monitor that supports the primary instruction set architecture and that runs on the physical host. The virtual machine monitor supporting the primary instruction set architecture cannot directly identify the type of the exception triggered by the secondary architecture virtual machine based on the first code of the exception. The virtual machine monitor obtains the second code of the exception triggered by the secondary architecture virtual machine from the exception mapping relationship, and identifies the type of the exception triggered by the secondary architecture virtual machine based on the second code of the exception, to handle the exception. The virtual machine monitor may be referred to as a virtual machine monitor, a VMM, or a hypervisor.

The processor includes the primary processor core supporting the primary instruction set architecture and the secondary processor core supporting the secondary instruction set architecture. Instructions of the secondary architecture virtual machine may be directly executed by the secondary processor core without instruction translation. This can avoid an instruction expansion problem caused by instruction translation. For the exception or interrupt triggered by the secondary architecture virtual machine, the virtual machine monitor may translate an unidentifiable first code into an identifiable second code based on an exception mapping table or an interrupt mapping table, and then learn of the type of the exception or interrupt based on the second code for handling. This method can ensure proper running of a virtual machine supporting the heterogeneous instruction set architecture, and accurate identification and handling of an exception or interrupt of the secondary architecture virtual machine. This prevents a system crash caused by a failure to handle the exception or interrupt because the virtual machine monitor cannot identify a type of the exception or interrupt. Therefore, this method can improve system stability, enable the heterogeneous instruction set virtual machine to run properly, and build a diversified software ecosystem.

Further, the virtual machine monitor identifies the type of the exception or interrupt based on the code of the exception or interrupt that is in the primary instruction set architecture and that corresponds to the exception or interrupt triggered by the secondary architecture virtual machine. The virtual machine monitor can handle the exception or interrupt triggered by the primary architecture virtual machine supporting the primary instruction set architecture, and has corresponding processing logic for different types of exceptions or interrupts. Therefore, in the process of handling the exception or interrupt triggered by the secondary architecture virtual machine, the physical host may reuse software processing logic for handling an exception or interrupt triggered by the primary architecture virtual machine. Instead of configuring exception or interrupt processing logic supporting two instruction set architectures, in the method provided in this embodiment of this application, only the virtual machine monitor supporting the primary instruction set architecture is configured to handle exceptions or interrupts triggered by virtual machines supporting the two instruction set architectures. This causes a low implementation difficulty and does not require additional software design complexity and costs.

In an implementation, the physical host includes a hardware device supporting hardware-assisted virtualization, and the hardware device supports the primary instruction set architecture. The hardware-assisted virtualization is a platform virtualization method that implements effective virtualization with assistance of hardware functions. In the hardware-assisted virtualization (hardware-assisted virtualization), hardware provides structural support to assist in creating a virtual machine monitor and allows a guest operating system to run independently. For example, an EPT in an MMU in an x86 architecture and two-stage address translation (referred to as two-stage address translation in a RISC architecture or stage 2 translation in an ARM architecture) are used to accelerate a mapping process from a virtual address to a physical address. For example, an interrupt controller of hardware is configured to obtain an interrupt request from another hardware device and send the interrupt request to the processor.

In the method, handling the exception or interrupt includes handling the exception or interrupt by using the hardware device supporting hardware-assisted virtualization, to improve a speed of handling the exception. Because the hardware device supporting hardware-assisted virtualization in the primary instruction set architecture is reused, no additional hardware complexity and costs are required.

In an implementation, the physical host further includes a secondary architecture register. The obtaining status information of the exception or interrupt triggered by the secondary architecture virtual machine includes:

obtaining the status information of the exception or interrupt from a shared memory or shared register. The shared memory or shared register is a communication channel between the secondary processor core and the primary processor core, is shared by the secondary processor core and the primary processor core, is storage space that can be accessed by both the secondary processor core and the primary processor core, and is configured to store the status information of the exception. The status information of the exception or interrupt is copied by the secondary processor core from the secondary architecture register to the shared memory. The secondary architecture register is a register that complies with the specification of the secondary instruction set architecture. However, the virtual machine monitor supporting the primary instruction set architecture cannot directly read the status information of the exception from the secondary architecture register. Therefore, in this method, the shared memory is designed to transfer the status information of the exception or interrupt.

In another implementation, the physical host further includes the shared register. The obtaining status information of the exception or interrupt triggered by the secondary architecture virtual machine includes: obtaining the status information of the exception or interrupt from the shared register. The shared register is a register that is shared by the secondary processor core and the primary processor core and is configured to store the status information of the exception triggered by the secondary architecture virtual machine. Different from a conventional register that supports only a specification of a single instruction set architecture, the shared register may comply with specifications of two instruction set architectures: the specification of the primary instruction set architecture and the specification of the secondary instruction set architecture, and can be accessed by the primary processor core and the secondary processor core. For the secondary architecture, the shared register may be configured to store the status information of the exception or interrupt triggered by the secondary architecture virtual machine. For the primary architecture, the primary architecture virtual machine monitor may obtain the status information of the exception or interrupt from the shared register.

In an implementation, the status information of the exception further includes at least one of an instruction triggering the exception or an address triggering the exception. The status information of the exception may further include other status information. Different types of exceptions may have different exception status information. The exception status information indicates information required for handling the exception and indicates a status of a system when the exception is triggered, for example, an exception triggered by a system call instruction. In this case, the status information of the exception is a parameter of a system call and is stored in the secondary architecture register. The instruction triggering the exception is an instruction that causes the secondary architecture virtual machine to trigger the exception, or an instruction that is being executed when the secondary architecture virtual machine triggers an exception. The address triggering the exception is an address that causes the secondary architecture virtual machine to trigger the exception, or a memory address that the secondary architecture virtual machine needs to access when the secondary architecture virtual machine triggers the exception. The exception mapping relationship or interrupt mapping relationship further includes a correspondence between the secondary architecture register and a primary architecture register. The primary architecture register is a register that complies with the specification of the primary instruction set architecture, and the secondary architecture register is a register that complies with the specification of the secondary instruction set architecture and that is configured to store the status information of the exception.

Before identifying the type of the exception or interrupt based on the second code of the exception, and handling the exception or interrupt, the method further includes: searching for the primary architecture register corresponding to the secondary architecture register based on the exception mapping relationship or interrupt mapping relationship; and writing the second code of the exception and at least one of the instruction triggering the exception and the address triggering the exception into the primary architecture register; or writing the second code of the interrupt into the primary architecture register.

Correspondingly, the identifying the type of the exception or interrupt based on the second code of the exception or interrupt, and handling the exception or interrupt includes: reading, from the primary architecture register, the second code of the exception and at least one of the instruction triggering the exception and the address triggering the exception; and handling the exception based on the second code of the exception and at least one of the instruction triggering the exception and the address triggering the exception; or reading the second code of the interrupt from the primary architecture register, identifying the type of the interrupt based on the second code of the interrupt, and handling the interrupt. When handling an exception or interrupt triggered by the primary architecture virtual machine, the virtual machine monitor reads the status information of the exception or interrupt from the primary architecture register to handle the exception or interrupt. In this method, to make fewer changes to software logic of an original virtual machine monitor, after searching for the second code of the exception or interrupt triggered by the secondary architecture virtual machine, the virtual machine monitor writes the second code, the instruction triggering the exception, and the address triggering the exception into the primary architecture register. In this way, the virtual machine monitor can handle the exception or interrupt triggered by the secondary architecture virtual machine as an exception triggered by the primary architecture virtual machine.

Certainly, in another implementation, the virtual machine monitor may directly identify and handle the exception or interrupt based on the obtained second code of the exception or interrupt and the instruction triggering the exception and the address triggering the exception that are obtained from the shared memory or shared register. In this case, the virtual machine monitor does not need to first store the information in the primary architecture register and read the information from the primary architecture register to identify or handle the exception or interrupt.

According to a second aspect, this application provides a compute node. The compute node includes a memory and a processor. The processor includes a primary processor core supporting a primary instruction set architecture and a secondary processor core supporting a secondary instruction set architecture. The memory stores computer instructions. The primary processor core runs the computer instructions to perform the method according to any one of the first aspect and the implementations of the first aspect.

According to a third aspect, this application provides a computer-readable storage medium. Computer instructions are stored in the computer-readable storage medium, and invoked by a processor to perform the method according to any one of the first aspect and the implementations of the first aspect.

According to a fourth aspect, this application provides a physical host. The physical host includes a translation module and a simulation module. For a specific implementation of the translation module, refer to a translation module 304 or a RISC-V translation module 404 in a specific embodiment. For a specific implementation of the simulation module configured to handle an exception, refer to a RISC-V exception simulation module 406 or an exception simulation module 306 in a specific embodiment. For a specific implementation of the simulation module configured to handle an interrupt, refer to a RISC-V interrupt simulation module 407 or an interrupt simulation module 307 in a specific embodiment.

The translation module is configured to:
when a secondary architecture virtual machine triggers an exception or interrupt, obtain status information of the exception or interrupt, where the secondary architecture virtual machine is a virtual machine that supports a secondary instruction set architecture and that runs on the physical host, the status information of the exception includes first code of the exception, the first code of the exception indicates a type of the exception in the secondary instruction set architecture, the status information of the interrupt includes first code of the interrupt, and the first code of the interrupt indicates a type of the interrupt in the secondary instruction set architecture; and obtain second code of the exception or interrupt from an exception mapping relationship or interrupt mapping relationship, where the second code of the exception indicates a type of the exception in a primary instruction set architecture, the second code of the interrupt indicates a type of the interrupt in the primary instruction set architecture, the exception mapping relationship includes a correspondence between first code and second code of each type of exception in a plurality of types of exceptions, and the interrupt mapping relationship includes a correspondence between first code and second code of each type of interrupt in a plurality of types of interrupts.

The simulation module is configured to: identify the type of the exception or interrupt based on the second code of the exception or interrupt, and handle the exception or interrupt.

In an implementation, the physical host further includes a secondary architecture register, and the translation module is further configured to:
obtain the status information of the exception or interrupt from a shared memory. The shared memory is shared by a secondary processor core and a primary processor core. The status information of the exception or interrupt is copied from the secondary architecture register to the shared memory. The secondary architecture register is a register that complies with a specification of the secondary instruction set architecture and that is configured to store the status information of the exception or interrupt triggered by the secondary architecture virtual machine.

In an implementation, the physical host further includes a shared register, and the translation module is further configured to:
obtain the status information of the exception or interrupt from the shared register. The shared register is shared by the secondary processor core and the primary processor core, and the shared register stores the status information of the exception or interrupt.

In an implementation, the physical host further includes the secondary architecture register and a primary architecture register. The interrupt mapping relationship further includes a correspondence between the secondary architecture register and the primary architecture register. The primary architecture register is a register that complies with a specification of the primary instruction set architecture. The secondary architecture register is a register that complies with the specification of the secondary instruction set architecture and is configured to store the status information of the interrupt.

The translation module is further configured to: search, based on the interrupt mapping relationship, for the primary architecture register corresponding to the secondary architecture register; and write the second code of the interrupt into the primary architecture register.

The simulation module is configured to: read the second code of the interrupt from the primary architecture register, and handle the interrupt based on the second code of the interrupt.

In an implementation, the physical host further includes the secondary architecture register and a primary architecture register. The status information of the exception further includes at least one of an instruction triggering the exception or an address triggering the exception. The exception mapping relationship further includes a correspondence between the secondary architecture register and the primary architecture register. The primary architecture register is a register that complies with a specification of the primary instruction set architecture. The secondary architecture register is a register that complies with the specification of the secondary instruction set architecture and is configured to store the status information of the exception.

The translation module is further configured to: search, based on the exception mapping relationship, for the primary architecture register corresponding to the secondary architecture register; and write the second code of the exception into the primary architecture register, and at least one of the instruction triggering the exception and the address triggering the exception into the primary architecture register.

The simulation module is configured to: read, from the primary architecture register, the second code of the exception and at least one of the instruction triggering the exception and the address triggering the exception; and handle the exception based on the second code of the exception and at least one of the instruction triggering the exception and the address triggering the exception.

In an implementation, the physical host includes a hardware device supporting hardware-assisted virtualization, and the hardware device supports the primary instruction set architecture.

The simulation module is configured to handle the exception by using the hardware device supporting hardware-assisted virtualization.

According to a fifth aspect, this application provides a computer program product. The computer program product includes computer instructions. The computer instructions are invoked by a processor to perform the method according to any one of the first aspect, the second aspect, and the implementations of the first aspect and the second aspect.

According to a sixth aspect, this application provides a chip. The chip includes a primary processor core supporting a primary instruction set architecture and a secondary processor core supporting a secondary instruction set architecture. The primary processor core is configured to perform the method according to any one of the first aspect and the implementations of the first aspect.

DESCRIPTION OF EMBODIMENTS

Figure 1:
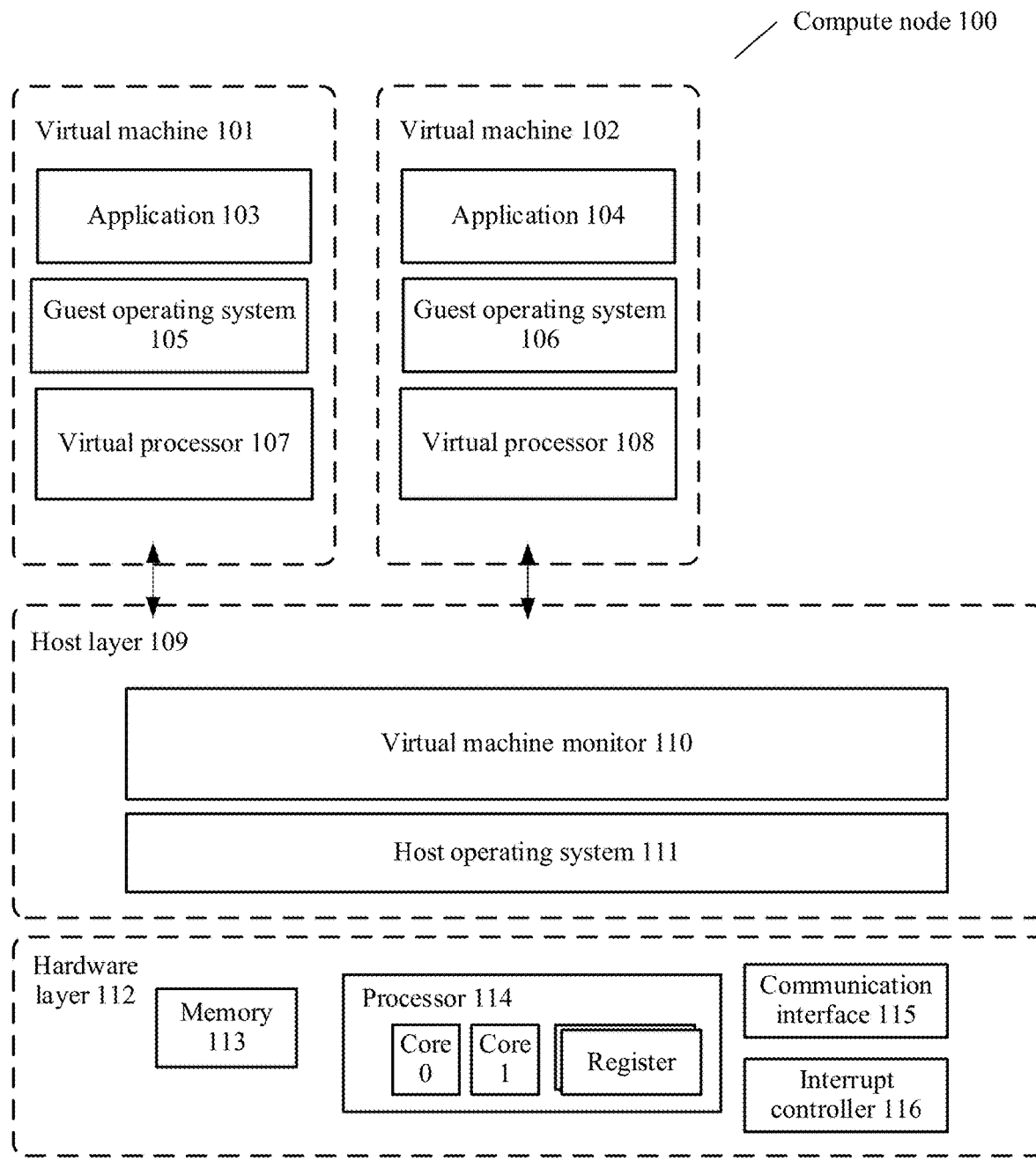
FIG. 1 is a schematic diagram of a structure of a compute node 100 according to an embodiment of this application.

To facilitate understanding of embodiments of this application, some basic concepts in the virtualization field are first described by using a compute node 100 shown in FIG. 1 as an example in this application.

Virtualization virtualizes a hardware resource (for example, storage space in a processor or memory and a network resource) at a hardware layer of a compute node and shares the virtualized resource with a plurality of virtual computers. A virtual computer is a general name of running environments virtualized by software in all types of virtualized devices, and this concept includes a virtual machine and a container.

As shown in FIG. 1, the compute node 100 includes a hardware layer 112, a host layer 109, and a virtualization layer. The virtualization layer includes virtual machines 101 and 102. There may be more or fewer virtual machines. Herein, only two virtual machines are used as an example. The hardware layer 112 includes a processor 114, a memory 113, a communication interface 115, and an interrupt controller 116.

A virtual machine (virtual machine, VM) is one or more virtual computers simulated on a physical compute node by using virtualization software. The virtual machine runs in a completely isolated environment, and works like a real computer. A guest operating system (guest operating system, guest OS) (105 and 106 in FIG. 1) may be installed on the virtual machine (101 and 102 in FIG. 1), and one or more applications (103 and 104 in FIG. 1) are run on the guest operating system. The virtual machine may also access a network resource. An application running on the virtual machine works as if the application works on a real computer.

A virtual processor (for example, 107 and 108 in FIG. 1) is a physical processing unit provided to a virtual computer for use in a sharing or slicing manner in a virtualization technology, for example, a virtual central processing unit (virtual central processing unit, vCPU). One virtual computer may be served by one or more virtual processors. When there are a plurality of virtual processors, usually, one virtual processor is a primary virtual processor, and others are secondary virtual processors. Other virtual hardware resources such as a virtual memory included in the virtual machine are not shown in FIG. 1. It should be understood that the virtual machine is equivalent to a standalone computer. Therefore, an action performed by the virtual machine may also be considered as an action performed by the virtual processor. The virtual processor is virtualized by using virtualization software. Running of the virtual processor is actually implemented as follows: A processor or physical core of a host reads and runs a software program. For example, a physical core reads the software program and runs the software program in a specific mode (for example, a non-root mode of x86) of hardware-assisted virtualization of the physical core, to implement the virtual processor. The plurality of virtual processors of the virtual machine may be located on different physical cores.

Trap-in and trap-out of a virtual processor: A virtual system includes two modes: a host mode (host mode) and a guest mode (guest mode). When a virtual processor enters a guest mode, this is referred to as trap-in (virtual); and when the virtual processor exits the guest mode, this is referred to as trap-out (virtual). After a virtual processor traps out, a physical processor temporarily stops executing code of the virtual processor. Therefore, this case may be understood as that the virtual processor is not running. When a virtual processor that runs on a physical processor traps in, it may be considered that the physical processor is in the guest mode, and code of the virtual processor is executed. When the virtual processor that runs on the physical processor traps out to the host mode, it may be considered that the physical processor is in the host mode, and runs host-related code, such as a virtual machine monitor.

The host (host) layer 109 is used as a management layer, and is used to manage and allocate a hardware resource, present a virtual hardware platform for a virtual machine, schedule and isolate a virtual machine, and the like. In some implementations, the host layer 109 includes a host operating system 111 and a virtual monitoring apparatus, for example, a virtual machine monitor 110 (virtual machine monitor, VMM). The virtual monitor 110 may be deployed inside the host operating system 111 or outside the host operating system 111. In another virtualization architecture, the virtual monitoring apparatus may also be referred to as a hypervisor or another type of virtual monitoring apparatus. In some other implementations, for example, in a virtualization architecture Xen, the host layer 109 may further include one privileged virtual machine. The virtual hardware platform provides virtual computers running on the virtual hardware platform with various hardware resources, such as a virtual processor, a virtual memory, a virtual disk, and a virtual network interface card. The virtual computers run on the virtual hardware platform prepared by the host layer for the virtual computers. The host layer 109 may also be referred to as a virtualization platform, and sometimes the host layer may also be referred to as a host for short.

The hardware layer 112 is a hardware platform on which a virtualized environment runs. The hardware layer may include a plurality of types of hardware. As shown in FIG. 1, the hardware layer may include a processor 114 and a memory 113, may further include a communication interface 115, for example, a network interface card (network interface card, NIC), and may further include an interrupt controller 116, an input/output (input/output, I/O) device, and the like. The processor 114 may include a plurality of physical cores, such as a core 1 and a core 0.

The processor 114 is sometimes referred to as a physical processor. A physical core represents a minimum processing unit in a processor. As shown in FIG. 1, in this embodiment, the processor may have two physical cores: the core 0 and the core 1, and a plurality of registers. In some other embodiments, the processor may include more or fewer cores, and different processors may include different quantities of cores. A processor with a plurality of physical cores is referred to as a multi-core processor. Multi-core processors can be classified into homogeneous multi-core processors and heterogeneous multi-core processors based on whether core architectures are the same. A virtual processor may be bound to a physical core. In other words, a virtual processor always runs on a specific physical core, and cannot be scheduled onto another physical core for running. In this case, the virtual processor is a bound core. If a virtual processor may be scheduled, depending on a requirement, onto different physical cores for running, the virtual processor is not a bound core.

The interrupt controller 116 is disposed between a processor and hardware that triggers an interrupt request, and is mainly configured to collect interrupt requests generated by hardware, and send the interrupt requests to the processor based on a specific priority or according to another rule. For example, the interrupt controller is an advanced programmable interrupt controller (advanced programmable interrupt controller, APIC).

An interruption (interruption) suspends executing an instruction of a current program and executes an interrupt service routine.

An interrupt service routine (interrupt service routine, ISR) is a routine used to handle an interrupt request. When receiving an interrupt request, a processor suspends executing a current program and executes an interrupt service routine corresponding to the interrupt request.

An interrupt request (interrupt request) is an event generated by hardware. The hardware sends the event to a processor. When receiving the event, the processor suspends executing a current program and executes a routine corresponding to the event. The interrupt request generated by hardware may be triggered by the hardware, or may be triggered by software. The interrupt request is sometimes referred to as an interrupt. Some hardware (such as a network interface card, an audio card, a mouse, and a hard disk) in a computer can complete specific work without intervention of the processor. However, the hardware still needs to periodically interrupt the processor, and require the processor to do some specific work for the hardware. An interrupt number is an identifier of an interrupt request, and is represented by IRQ ID in this application.

The hardware layer 112 may further include a memory management unit (memory management unit, MMU). The MMU is computer hardware configured to processing a memory access request. Its functions include translation from a virtual address to a physical address (namely virtual memory management), memory protection, and control of a central processing unit cache. The MMU usually uses an associative cache (associative cache) of a translation lookaside buffer (translation lookaside buffer, TLB) to translate a virtual page number to a physical page number.

Storage space (address space) provided by the memory 113 is allocated to a virtual machine and a host for use. A host physical address (host physical address, HPA) is physical address space that can be used by a local host (host). A host virtual address (host virtual address, HVA) is virtual address space that can be used by the local host (host). A guest physical address (guest physical address, GPA) is physical address space that can be used by a guest operating system of a virtual machine. A guest virtual address (guest virtual address, GVA) is virtual address space that can be used by the guest operating system of the virtual machine.

When a virtual machine requests to access the GVA, the MMU needs to translate the GVA to the GPA and then translate the GPA to the HPA. A shadow page table is used for direct translation from the GVA to the HPA. An extended page table (extended page table, EPT) is used for translation from the GPA to the HPA, and the translation from the GVA to the GPA is performed by using a guest page table. The EPT is maintained by the VMM, and the translation process of the EPT is completed by hardware. This achieves higher translation efficiency than that of the shadow page table. A process of accelerating mapping from a virtual address to a physical address has different names in different architectures. The process is referred to as EPT in an x86 architecture, two-stage address translation in a RISC architecture, and stage 2 translation in an ARM architecture.

Figure 2:
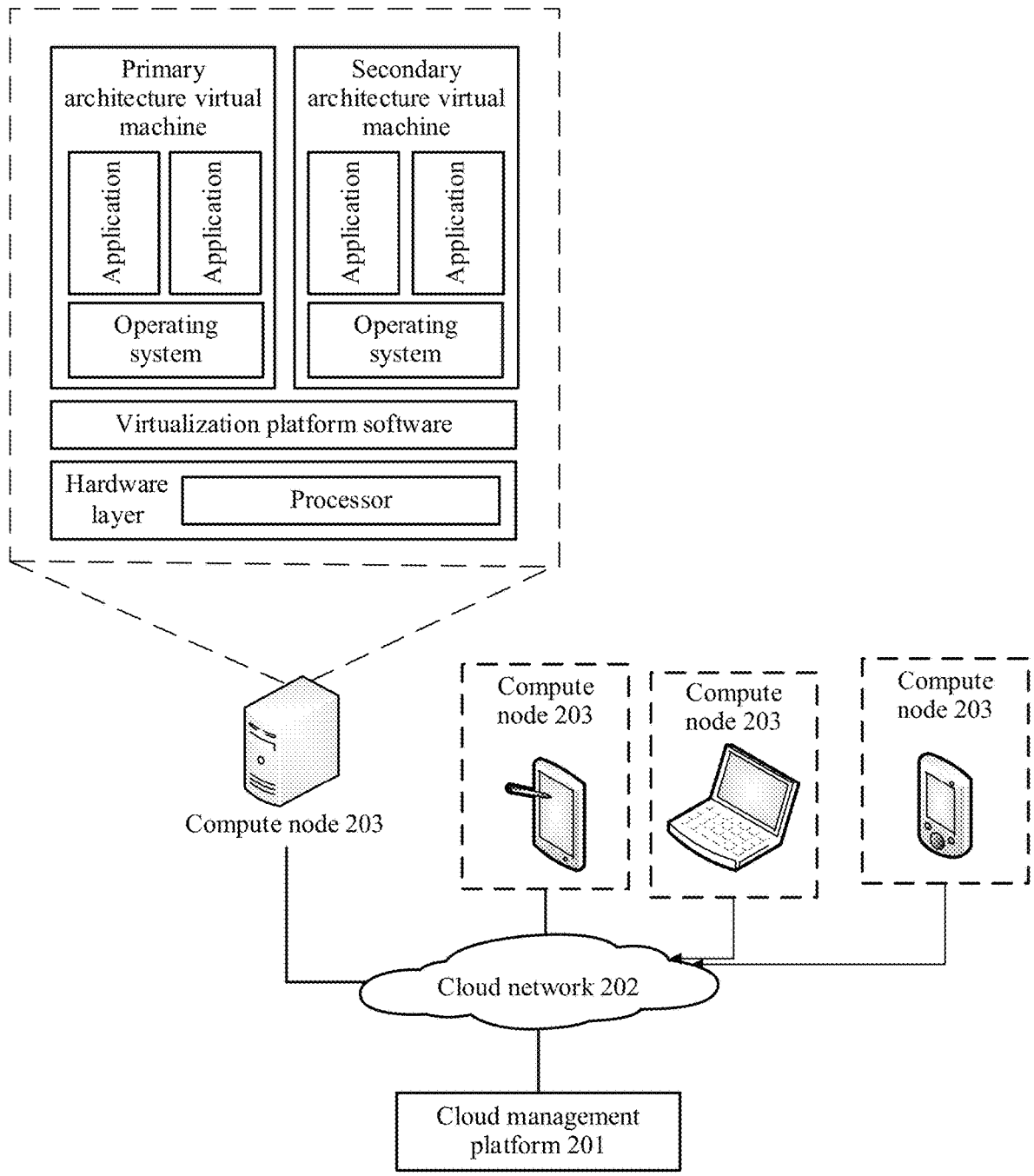
FIG. 2 is a schematic diagram of a structure of another compute node 203 according to an embodiment of this application.

FIG. 2 shows a system architecture 200 to which this application is applicable. The system architecture 200 is applicable to a public cloud scenario, a private cloud scenario, or a terminal cloud scenario. The system architecture 200 includes a cloud management platform 201, one or more compute nodes 203, and a cloud network 202. The cloud management platform 201 may be communicatively connected to the one or more compute nodes 203 over the cloud network 202, to configure and manage the compute nodes. The compute nodes may also be communicatively connected to each other over the cloud network. The compute node 203 may be a physical device, for example, a server or a terminal device. The terminal device may be a handheld device with a wireless connection function, or another processing device connected to a wireless modem. For example, the terminal device may be a mobile phone, a computer, a tablet computer, a personal digital assistant (personal digital assistant, PDA), a mobile Internet device (mobile Internet device, MID), a wearable device, and an e-book reader (e-book reader), and may also be a portable mobile device, a pocket-sized mobile device, a hand-held mobile device, a computer built-in mobile device, or a vehicle-mounted mobile device.

The compute node 203 in FIG. 2 may include some or all components of the compute node 100 in FIG. 1. A plurality of virtual machines that support different instruction set architectures, that is, a primary architecture virtual machine and a secondary architecture virtual machine, may run on the compute node 203. Different instruction set architectures include a primary instruction set architecture (a primary architecture for short) and a secondary instruction set architecture (a secondary architecture for short). The primary architecture and the secondary architecture may be any two instruction set architectures, for example, any two of the x86 architecture, the ARM architecture, and the RISC-V architecture. The RISC-V architecture is an open-source instruction set architecture based on reduced instruction set computing (reduced instruction set computing, RISC).

Computer instructions are instructions and commands that instruct a machine to operate. A program is a series of instructions arranged according to a given sequence. A process of executing the program is a working process of a computer. An instruction set (instruction set) is a set of instructions used to compute and control a computer system in a CPU. Each CPU is designed with a series of instruction systems that match a hardware circuit of the CPU. Instruction strength is also an important indicator of the CPU, the instruction set is one of most effective tools to improve efficiency of a microprocessor. A common instruction set architecture ISA includes complex instruction set computing (complex instruction set computing, CISC) and reduced instruction set computing (reduced instruction set computing, RISC). Typical CISC is X86, and typical RISC architectures are an advanced reduced instruction set computing machine (advanced risc machine, ARM) architecture and a microprocessor without interlocked pipelined stage (microprocessor without interlocked pipelined stages, MIPS) architecture.

Virtualization platform software is located between the virtual machine and the hardware layer, and is configured to manage and control the virtual machine running on the virtualization platform software. A virtualization platform may include a part or all of the host layer 109 in FIG. 1. Virtual machines that support different instruction set architectures may run on the virtualization platform software, for example, the primary architecture virtual machine and the secondary architecture virtual machine shown in FIG. 2. Only a primary architecture virtual machine may previously run on the compute node 203. When a user needs a virtual machine that supports a new instruction set, the user may deliver a request to the compute node 203 by using the cloud management platform 201 to create the secondary architecture virtual machine. The secondary architecture virtual machine supports a new instruction set architecture. After receiving the request, the virtualization platform software may create and start the secondary architecture virtual machine. An operating system and an application that support a secondary architecture instruction set run on the secondary architecture virtual machine. The user only needs to start the virtual machine that supports the new instruction set on the original virtualization platform, without replacing all applications and operating systems of the primary architecture virtual machine. In this way, the compute node is compatible with virtual machines of different instruction set architectures, requiring lower costs than those of full replacement.

To ensure proper running of the secondary architecture virtual machine, it is important that a processor at the hardware layer can execute instructions of the secondary architecture virtual machine, especially those related to handling an exception or interrupt in the secondary architecture.

The processor supports only a single instruction set architecture (primary architecture), and cannot identify a definition of an instruction of the secondary architecture virtual machine. Therefore, in a conventional instruction translation solution, a simulator is configured to translate the instruction of the secondary architecture virtual machine into an instruction in the primary instruction set architecture, and then the simulator processes the translated instruction in a software-only simulation manner. The simulator may be implemented at the host layer. In an instruction translation solution, an instruction of the secondary architecture virtual machine is first translated into an abstract internal representation of the simulator, and then the simulator translates the abstract internal representation into a semantically equivalent instruction in the primary architecture. The instruction in the primary architecture obtained through translation has the same semantic as the instruction of the secondary architecture virtual machine.

An execution process of the translated instruction in the primary architecture is related to a type of the instruction of the secondary architecture virtual machine. Types of instructions before and after translation are the same. In other words, if the instruction of the secondary architecture virtual machine is a non-privileged instruction, the instruction in the primary architecture obtained through translation is also a non-privileged instruction. Alternatively, if the instruction of the secondary architecture virtual machine is a privileged instruction, the instruction in the primary architecture obtained through translation is also a privileged instruction. If the instruction of the secondary architecture virtual machine is a non-privileged instruction, the translated instruction in the primary architecture may be directly executed to implement simulation. If the instruction of the secondary architecture virtual machine is a privileged instruction, the simulator is required to assist in processing the translated instruction in the primary architecture. The privileged instruction is a type of instruction related to system security. In a computer system, some instructions are related to the system security, for example, a memory zero-out instruction. If a program can use such instructions, it means that the program can zero out memory data of another program. Therefore, the computer system classifies instructions into privileged instructions (such as the memory zero-out instruction) and non-privileged instructions (such as an ordinary operation instruction). The privileged instruction is an instruction that has a special permission, and is used to invoke a system function, system software, or the like, for example, clearing a memory, configuring a timer, allocating a system resource, modifying a segment table and a page table of a virtual memory, or modifying an access permission of a user.

If the translated instruction in the primary architecture is a privileged instruction and requests to access a virtual hardware resource, the simulator supporting the primary architecture needs to simulate, according to a hardware device specification of the secondary architecture, an execution process in which the secondary architecture virtual machine accesses the virtual hardware resource. The hardware device specification of the secondary architecture and a hardware device specification of the primary architecture vary according to supported instruction set architectures.

If the translated instruction in the primary architecture further triggers an exception, the simulator in the primary architecture simulates an execution process of handling an exception in the secondary architecture in a software simulation manner. It should be noted that, in the instruction translation solution, the instruction of the secondary architecture virtual machine is directly translated by the simulator and processed through software simulation. The simulator is implemented on a host. This is a fully simulated virtualization solution, without a hardware acceleration module (for example, a page table and an interrupt controller that are used for translation from a virtual address to a physical address in an MMU) in a hardware-assisted virtualization solution. A hardware resource presented to the virtual machine is implemented only by software. In the hardware-assisted virtualization solution, a virtual machine monitor needs to participate in handling an exception or interrupt. The instruction translation solution implemented by the simulator does not related to requiring the virtual machine monitor of the primary architecture to identify and handle the exception or interrupt triggered in the secondary architecture. However, in the instruction translation solution, there are a large quantity of instructions, a plurality of instructions in the primary architecture are required to implement semantics equivalent to an instruction of the secondary architecture virtual machine. For example, after an instruction of the secondary architecture virtual machine is translated, a plurality of instructions in the primary architecture are obtained to indicate the same semantics as the instruction of the secondary architecture virtual machine. The simulator needs to determine whether the translated instructions in the primary architecture trigger an exception, and the simulator needs additional determining logic. In addition, the simulator simulates processing logic for the secondary architecture virtual machine to access a virtual hardware resource in the software-only simulation manner. The software-only simulation manner has poor performance.

Vendors provide a hardware-assisted virtualization technology for instruction set architectures used by the vendors. In the hardware-assisted virtualization technology, a hardware module is used to accelerate a process in which a virtual machine accesses a virtual hardware resource, thereby improving performance of the virtual machine. For example, an extended page table (extended page table, EPT) is used to accelerate translation from a GPA to an HPA. An Intel® VT-X (virtualization technology) technology introduces new privileged instructions and a new running mode to accelerate execution of privileged instructions of the virtual machine. The interrupt controller can handle a virtual interrupt and accelerate the handling of the interrupt of the virtual machine. When an exception or interrupt is triggered in a virtualization scenario using the hardware-assisted virtualization technology, a virtual machine monitor handles the exception or interrupt. A processor reads, from a hardware register, the exception or interrupt information registered by the virtual machine monitor in the register, and notifies the virtual machine monitor to handle the exception or interrupt. The virtual machine monitor needs to handle the exception or interrupt based on status information of the exception or interrupt.

The status information of the exception includes a type of the exception, an instruction triggering the exception, and an address triggering the exception. The exception (exception) is a handling request after an instruction fails to be executed. For example, the type of the exception is a page fault exception, and is an exception that occurs when the virtual machine accesses a virtual memory. To handle the exception, the virtual machine monitor needs to obtain an address of the virtual memory that triggers the page fault exception. The instruction triggering the exception is an instruction that is being executed when the exception occurs. For example, if the type of the exception is an invalid instruction exception, the invalid instruction is the instruction triggering the exception. After obtaining the instruction triggering the exception, the virtual machine monitor may learn of which instruction triggers the exception, to handle the exception.

The status information of the interrupt includes a type of the interrupt. Common types of interrupts include inter-core interrupt, partial interrupt (including timer interrupt and performance monitoring interrupt (performance monitoring interrupt, PMI)), and external interrupt (an interrupt mainly triggered by peripherals such as a disk and a network interface card). For example, when the secondary architecture virtual machine executes an instruction, if the secondary architecture processing logic receives an external interrupt from an external device, or an inter-core interrupt sent between virtual processors of the secondary architecture virtual machine, these interrupts may be referred to as interrupts in the secondary architecture. In other words, an interrupt is triggered in a software or hardware environment of the secondary architecture.

The virtual machine monitor needs to obtain a type of the exception or interrupt so that the exception or interrupt can be handled based on the specific type. Code indicating the type of the exception or interrupt has different definitions in specifications of different instruction set architectures. A same type of interrupt or exception has different code in different instruction set architectures. For example, code values may be different, and formats for storing the code values may also be different. Different formats for storing the code values may be understood as different fields for storing the code values and different quantities of fields. For example, in the RISC-V architecture, code and coding format of a stage 2 instruction page fault exception is indicated by "interrupt=(0), and exception code=(20)". Code values are 0 and 20, and are indicated by using the interrupt and exception code fields. In the ARM architecture, code and coding format of the stage 2 instruction page fault exception is "RES0=(0x0), EC=(0x20), IL=(0x1), and ISS=(0x8E)". Code values are 0x0, 0x20, 0x1, and 0x8E, and are recorded in the RES0, EC, IL, and ISS fields.

Further, different instruction set architectures have different registers for storing status information of an exception or interrupt. For example, status information of an exception or interrupt in the ARM architecture is stored in a register that complies with a specification of the ARM architecture, and status information of an exception or interrupt in the RISC-V architecture is stored in a register that complies with a specification of the RISC-V architecture. A virtual machine monitor supporting the ARM architecture obtains code from the register that complies with the specification of the ARM architecture. A virtual machine monitor supporting the RISC-V architecture obtains code from the register that complies with the specification of the RISC-V architecture. The virtual machine monitors separately determine a type of the exception or interrupt, and handle the exception or interrupt based on the type.

Therefore, in a system that supports the heterogeneous instruction set architecture virtual machine, when an interrupt or exception occurs in a secondary architecture virtual machine, code indicating a type of the interrupt or exception cannot be identified by a primary architecture virtual machine monitor that supports the primary instruction set architecture, and the primary architecture virtual machine monitor cannot accurately identify the type of the interrupt or exception. In addition, the primary architecture virtual machine monitor cannot obtain status information required for handling the exception or interrupt. As a result, the primary architecture virtual machine monitor cannot handle the exception or interrupt triggered by the secondary architecture virtual machine, and the hardware-assisted virtualization technology cannot be applied to the scenario that supports the heterogeneous instruction set architecture virtual machine due to the lack of exception or interrupt handling.

In a system architecture provided in this embodiment of this application, the processor (for example, the processor of the compute node 203) may support a plurality of instruction set architectures, and may directly execute an instruction in a primary architecture instruction set and an instruction of a secondary architecture instruction set. Therefore, instruction translation does not need to be performed on an instruction in the secondary architecture. This can avoid an instruction expansion problem caused by instruction translation. When an exception or interrupt is triggered in the secondary architecture, in this application, code of the exception or interrupt is translated based on a stored mapping relationship. Translated code complies with a specification of the primary architecture, and the translated code is a definition of the exception or interrupt in the specification of the primary architecture. In this application, code indicating a type of the exception or interrupt in the specification of the primary architecture is found. This enables a primary architecture virtual machine monitor to identify the exception or interrupt in the secondary architecture, and allows reusing a hardware module supporting hardware-assisted virtualization in the primary architecture for handling.

Figure 3:
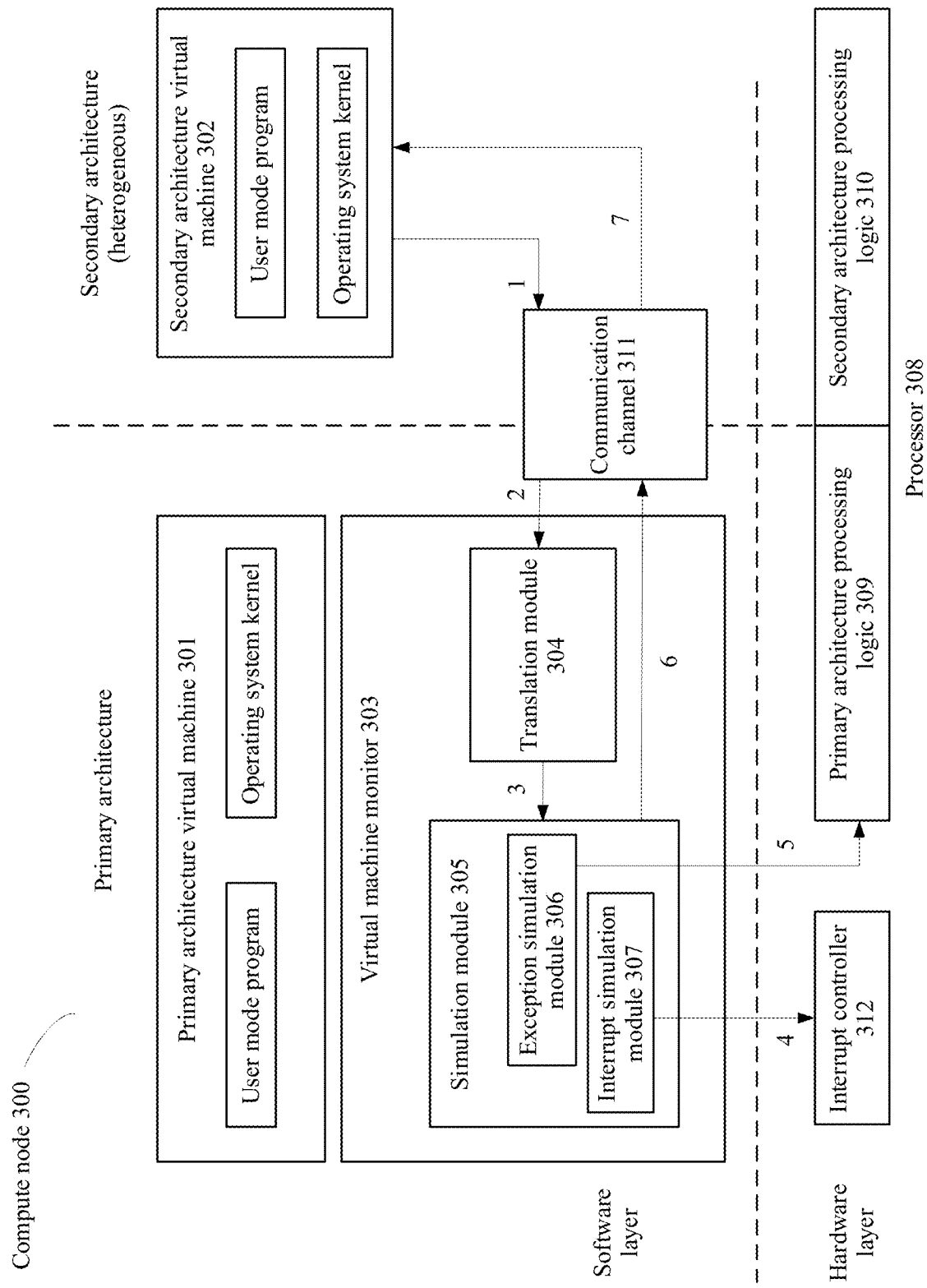
FIG. 3 is a schematic diagram of a structure of still another compute node 300 according to an embodiment of this application.

FIG. 3 is a schematic diagram of another structure of a compute node 300 according to an embodiment of this application. The compute node 300 shown in FIG. 3 may be some or all of the compute nodes shown in FIG. 1 and FIG. 2.

The compute node 300 may be divided into a software layer and a hardware layer. The hardware layer includes a processor 308 and an interrupt controller 312. The software layer includes a primary architecture virtual machine 301, a secondary architecture virtual machine 302, and a virtual machine monitor 303. The primary architecture virtual machine and secondary architecture virtual machine running on the compute node 300 support different instruction set architectures. The primary architecture virtual machine 301 supports a primary instruction set architecture (a primary architecture), and the secondary architecture virtual machine 302 supports a secondary instruction set architecture (a secondary architecture). A process executed on the secondary architecture virtual machine 302 and a process running on the primary architecture virtual machine 301 also support different instruction set architectures. The virtual machine monitor 303 runs in the primary architecture and supports the primary instruction set architecture. The running environment of the secondary architecture virtual machine 302 is prepared and started by the primary architecture virtual machine monitor 303.

The processor 308 includes primary architecture processing logic 309 and secondary architecture processing logic 310, and the processor 308 may be a multi-core processor. The primary architecture processing logic 308 or the secondary architecture processing logic 309 may be processor cores, or referred to as a CPU core. The primary architecture processing logic 308 may be referred to as a primary processor core, and the secondary architecture processing logic 309 may be referred to as a secondary processor core. The processing logic may also be referred to as a logical core, and is a core at a logical layer in a same physical core. For a relationship between the primary architecture processing logic and the secondary architecture processing logic in the multi-core processor, refer to FIG. 10 and corresponding descriptions.

Address space (for example, a shared memory) or a register that can be accessed by the primary architecture processing logic 309 and the secondary architecture processing logic 310 may be used as a communication channel 311 between the primary architecture and the secondary architecture. In the processor 308, a part that can be used to execute an instruction (a primary architecture instruction) in the primary instruction set architecture is primary architecture processing logic 309, and a part that can be used to execute an instruction (a secondary architecture instruction) in the secondary instruction set architecture is secondary architecture processing logic 310. Therefore, the processor 308 can identify definitions of the instructions of the two instruction set architectures, and does not need to translate the secondary architecture instruction into the primary architecture instruction that can be identified by the processor. An instruction that does not trigger an interrupt or exception, whether a privileged instruction or a non-privileged instruction, can be directly processed by the secondary architecture processing logic 309.

When the secondary architecture virtual machine 302 triggers an exception or interrupt, the secondary architecture processing logic 310 suspends execution of the secondary architecture virtual machine 302. The secondary architecture processing logic 310 stores status information of the exception or interrupt in the communication channel 311 between the primary and secondary architectures. The secondary architecture processing logic 310 notifies the virtual machine monitor 303 supporting the primary architecture to handle the exception or interrupt, and waits for the virtual machine monitor 303 to complete interrupt or exception handling. (Step 1) The secondary architecture processing logic is a processing unit that supports the secondary architecture, and the primary architecture processing logic is a processing unit that supports the primary architecture.

It should be noted that the interrupt triggered by the secondary architecture virtual machine may include an interrupt received by the secondary architecture processing logic 310 and a virtual interrupt generated by the secondary architecture virtual machine. The interrupt received by the secondary architecture processing logic 310 is a physical interrupt sent by the primary architecture interrupt controller 312 to the secondary architecture processing logic 310 in a running process of the secondary architecture virtual machine 302, or referred to as a hardware interrupt. The virtual interrupt generated by the secondary architecture virtual machine is an interrupt triggered by a virtual processor of the secondary architecture virtual machine, for example, an inter-core interrupt sent by a virtual processor VCPU 1 to a VCPU 2. The exception triggered by the secondary architecture virtual machine 302 is an exception triggered in a running process of the secondary architecture virtual machine 302, for example, a page fault exception triggered when the secondary architecture virtual machine 302 accesses a virtual memory or an invalid instruction exception triggered when the secondary architecture virtual machine 302 executes an invalid instruction.

After the virtual machine monitor 303 receives a notification, a translation module 304 obtains the status information of the exception or interrupt triggered in the secondary architecture from the communication channel 311. In this case, in the status information of the exception or interrupt obtained by the translation module 304, code indicating a type of the exception or interrupt type complies with a specification of the secondary architecture but does not comply with a specification of the primary architecture. The translation module 304 finds, based on a mapping table, code indicating a type of the interrupt or exception in the specification of the primary architecture. The mapping table stores a correspondence between codes indicating different types of exceptions or interrupts in the specification of the primary architecture and codes indicating different types of exceptions or interrupts in the specification of the secondary architecture. Then, the translation module 304 stores the found code indicating the type of the interrupt or exception in the primary architecture specification, an address triggering the exception, and an instruction triggering the exception in a primary architecture hardware register or memory that can be accessed by the virtual machine monitor 303. (Step 2) The primary architecture hardware register is a hardware register that supports the primary architecture hardware specification.

The simulation module 305 obtains the status information from the primary architecture hardware register or memory, and learns, based on the code in the status information, of the exception or interrupt triggered by the secondary architecture virtual machine and the specific type of the interrupt or exception. (Step 3)

If the secondary architecture virtual machine triggers an interrupt, an interrupt simulation module 307 obtains a specific type of the interrupt from the primary architecture hardware register or memory, and then uses the primary architecture interrupt controller 312 to handle the interrupt of this type. (Step 4)

The interrupt simulation module 307 sends a virtual interrupt to the secondary architecture virtual machine by simulating a behavior of the interrupt controller that complies with the specification of the secondary architecture, for example, managing a mapping relationship and a priority sequence of the virtual interrupt and a delivery process of the virtual interrupt. The interrupt simulation module 307 may be configured to manage a virtual interrupt mapping relationship. The virtual interrupt mapping relationship includes a mapping relationship between the virtual interrupt of the secondary architecture virtual machine and a secondary architecture virtual processor, and a mapping relationship between the secondary architecture virtual processor and a physical processor (or a physical core). The interrupt simulation module 307 may manage a priority sequence of a plurality of virtual interrupts for each secondary architecture virtual processor. When the plurality of virtual interrupts need to be sent to the virtual processor, the interrupt simulation module 307 obtains a virtual interrupt with a highest priority according to the priority sequence. The interrupt simulation module 307 obtains, based on the virtual interrupt mapping relationship, a physical processor (or a physical core) in which the secondary architecture virtual processor is located. The primary architecture interrupt controller 312 sends an interrupt notification to the physical processor (or the physical core). The physical processor stores information about the virtual interrupt in the hardware register of the secondary architecture processing logic, to complete delivery of the virtual interrupt. The information about the virtual interruption includes a type of the virtual interruption.

If the secondary architecture virtual machine triggers an exception, an exception simulation module 306 obtains a type of the exception from the primary architecture hardware register or memory and uses the primary architecture processing logic 309 and a hardware-assisted virtualization capability to handle the exception of the secondary architecture virtual machine. (Step 5)

The exception simulation module 306 is configured to simulate the exception triggered during running of the secondary architecture virtual machine. The exception simulation module 306 is classified into the following three types based on a correspondence between an exception in the primary architecture and the exception in the secondary architecture:

(1) If the primary architecture virtual machine monitor 303 can handle an exception of a same type as the exception in the secondary architecture (a primary architecture exception corresponding to the exception in the secondary architecture can be found in a mapping table), for example, a memory access exception, a method for handling the exception of the primary architecture virtual machine monitor may be directly reused, including software logic and a hardware-assisted virtualization capability of hardware.

(2) If the primary architecture virtual machine monitor 303 can handle an exception of a type similar to that of the exception in the secondary architecture (a primary architecture exception corresponding to the exception in the secondary architecture can be found in the mapping table), for example, an invalid instruction exception triggered by a TLB refresh instruction or an invalid instruction exception triggered by a debugging instruction, the exception simulation module 306 may read status information of the translated exception to obtain information required for simulating the exception of the type, for example, a secondary architecture instruction triggering the exception and parameter information attached to the secondary architecture instruction. Then, an instruction or exception handling module with a similar function in the primary architecture is selected. The information required for simulating the exception is entered according to a primary architecture instruction specification or an input parameter specification of the exception handling module. The instruction or exception handling module in the primary architecture is invoked for handling.

(3) If the primary architecture virtual machine monitor 303 does not have an exception type that is the same as or similar to that of the exception in the secondary architecture (a primary architecture exception corresponding to the exception in the secondary architecture is not found in the mapping table), for example, an exception triggered by a hypercall instruction, an exception triggered by a privileged instruction specific to the secondary architecture, or an access exception to address space of a virtual device, the exception simulation module 306 performs handling in a software-only simulation manner according to the hardware specification of the secondary architecture.

After handling the exception or interrupt of the secondary architecture virtual machine, the simulation module 305 stores a handling result in the communication channel 311, and notifies the secondary architecture processing logic 310 to resume execution. (Step 6)

After execution is resumed, the secondary architecture virtual machine obtains the handling result from the communication channel 311, and continues to execute subsequent instructions. (Step 7)

Figure 4:
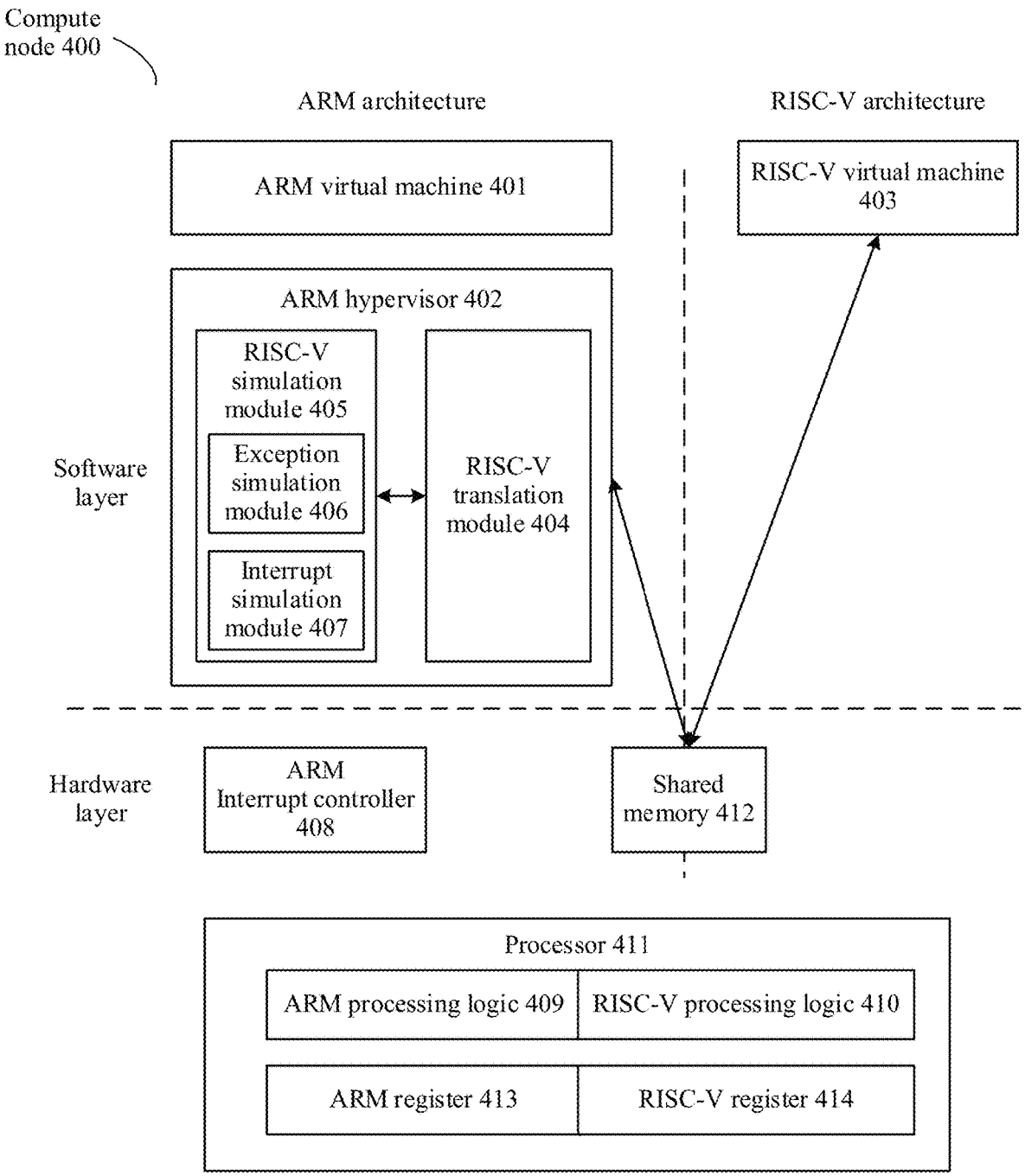
FIG. 4 is a schematic diagram of a structure of yet another compute node 400 according to an embodiment of this application.
Figure 5:
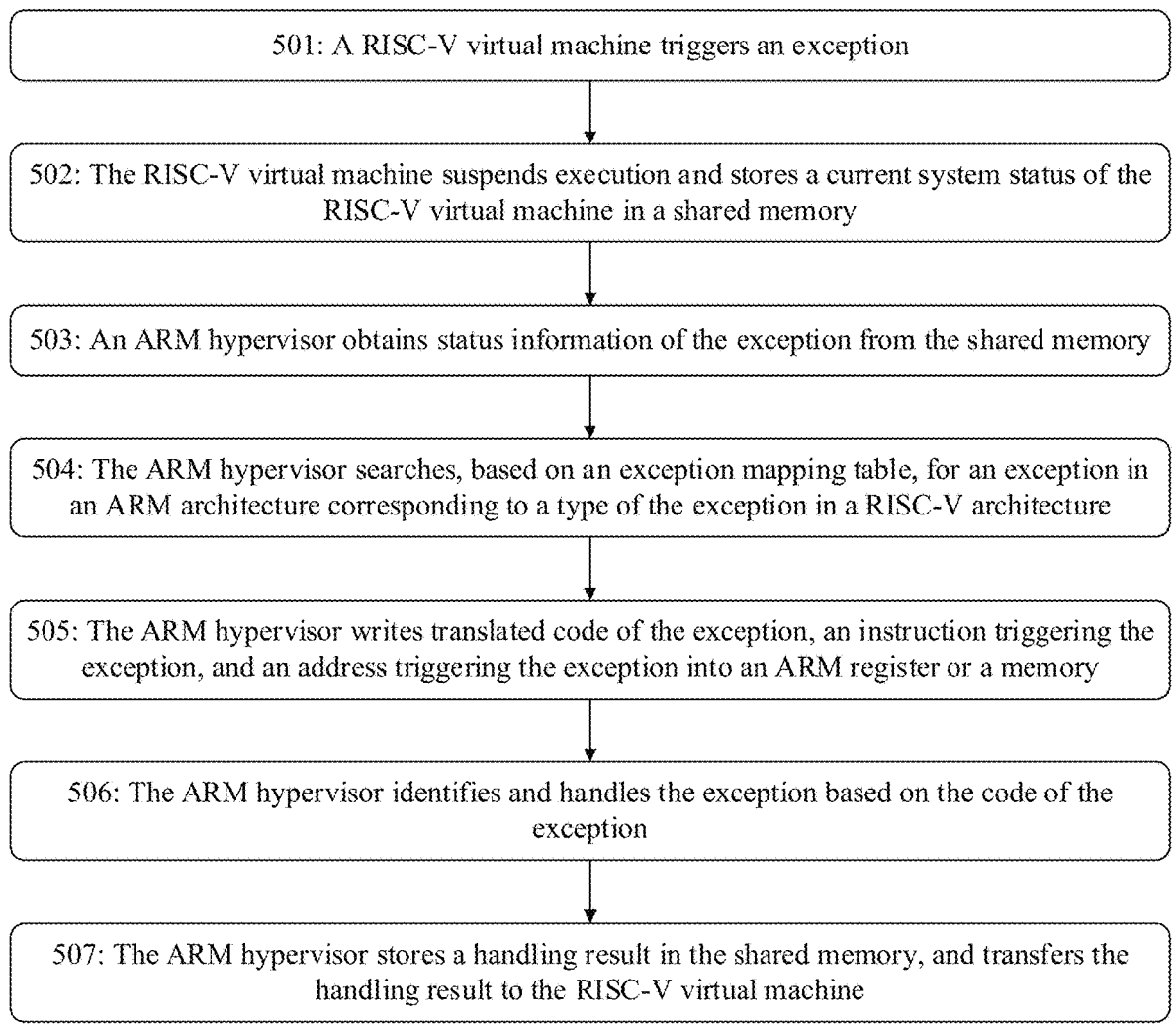
FIG. 5 is a flowchart of handling an exception triggered by a RISC-V virtual machine according to an embodiment of this application.
Figure 6:
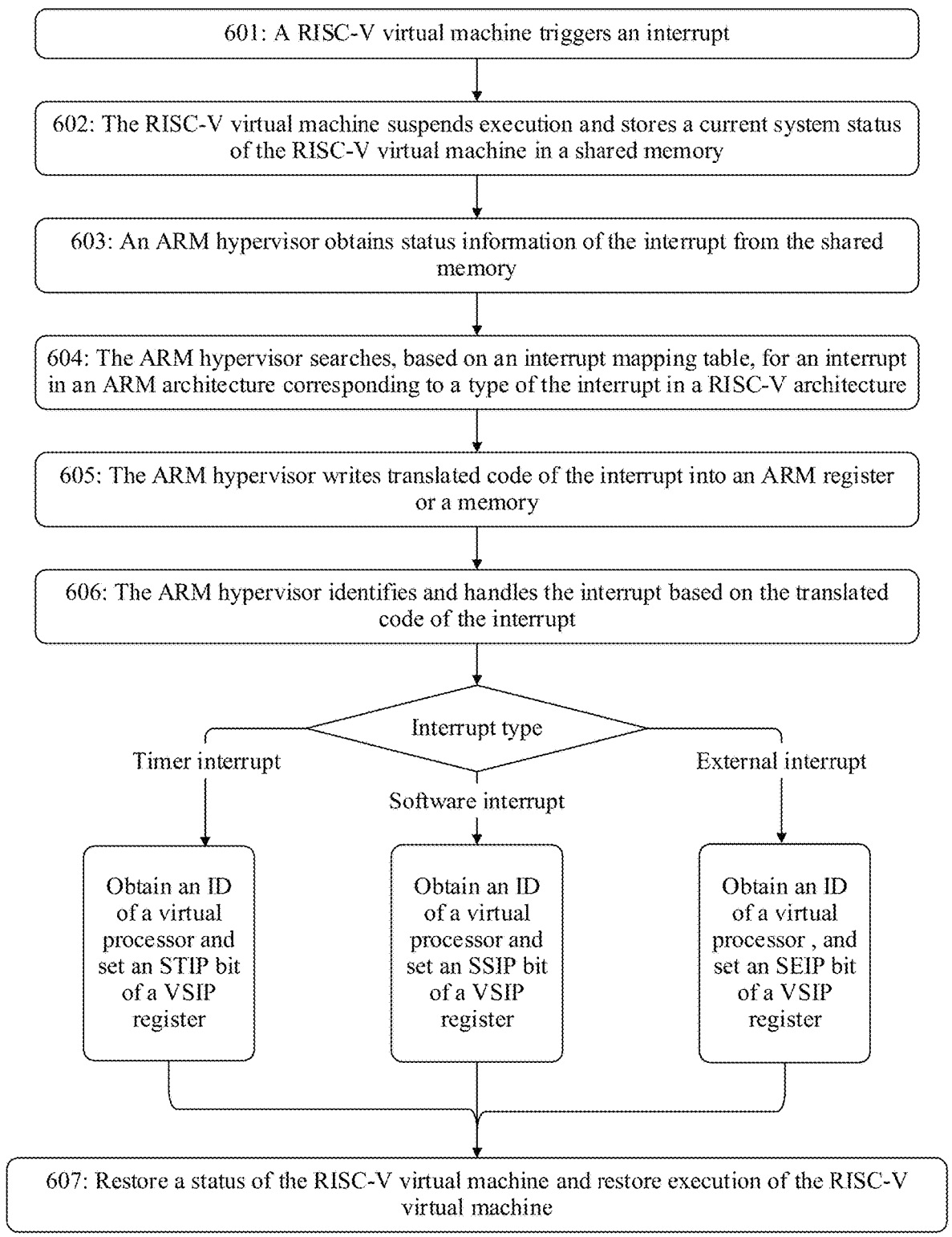
FIG. 6 is a flowchart of handling an interrupt triggered by a RISC-V virtual machine according to an embodiment of this application.

The following describes a method for running a virtual machine in a heterogeneous instruction set architecture provided in this application by using an example in which a primary architecture is the ARM architecture and a secondary architecture may be the RISC-V architecture. The method may be applied to a compute node 400. Execution procedures of the method are shown in FIG. 5 and FIG. 6. FIG. 4 shows a structure of the compute node 400. The structure of the compute node 400 is similar to that of the compute node 300 shown in FIG. 3.

A hardware layer of the compute node 400 includes a processor 411, an ARM interrupt controller, and a shared memory 412.

The processor 411 may include ARM processing logic 409 that can process an instruction in an ARM instruction set and RISC-V processing logic 410 that can process an instruction in a RISC-V instruction set. Because different hardware registers are used to store status information of an exception or interrupt in different instruction set architectures, the processor 411 in this application further includes one or more ARM registers 413 that comply with an ARM architecture specification and that are configured to store a type of an exception or interrupt that occurs in the ARM architecture, an address triggering the exception, and an instruction triggering the exception. The processor 411 further includes one or more RISC-V registers 414 that comply with a RISC-V architecture specification and that are configured to store a type of an exception or interrupt in the RISC-V architecture, an address triggering the exception, and an instruction triggering the exception. An exception or interrupt in an instruction set architecture or an exception or an interrupt triggered in an instruction set architecture is an exception triggered by a virtual machine that supports the instruction set architecture or an interrupt received by processing logic that supports the instruction set architecture. The RISC-V register 414 or ARM register 413 that stores status information of an exception or interrupt may be specifically a control and status register (Control and Status Register, CSR). There may be a plurality of control and status registers, which are respectively configured to store a type of the exception or interrupt, an instruction triggering the exception, and an address triggering the exception.

The ARM processing logic 409 cannot directly read the RISC-V register 414 to obtain the status information of the exception or interrupt in the RISC-V architecture. Therefore, in this embodiment of this application, the shared memory 412 is used to transmit the status information of the exception or interrupt in the RISC-V architecture. The shared memory 412 may be accessed by the ARM processing logic and the RISC-V processing logic, and is used to transmit the type of the exception or interrupt in the RISC-V architecture, the address triggering the exception, the instruction triggering the exception, and a handling result of the exception or interrupt by an ARM hypervisor and hardware in the ARM architecture.

For the control and status register 414, a floating-point register, and a general-purpose register in the RISC-V architecture, a design specification of the shared memory 412 defines an address range for storing a value of each register. In other words, the type of the exception or interrupt in the RISC-V architecture, the address triggering the exception, the instruction triggering the exception, and other data stored in the one or more status registers and the data stored in the floating-point register, and data stored in the floating-point register and the general-purpose register have fixed storage addresses in the shared memory 412. In addition, the ARM processing logic 409 may obtain data such as the type of the exception or interrupt, the address triggering the exception, and the instruction triggering the exception in the RISC-V architecture from a corresponding storage address in the shared memory 412. In this embodiment of this application, specifically, the ARM hypervisor 402 obtains the data from the shared memory 412.

A software layer of the compute node 400 includes an ARM virtual machine 401, a RISC-V virtual machine 403, and the ARM hypervisor 402. The RISC-V virtual machine 403 supports the RISC-V instruction set architecture, the ARM virtual machine 401 supports the ARM instruction set architecture, and the ARM hypervisor 402 is a hypervisor supporting the ARM instruction set architecture.

In this application, a RISC-V translation module 404 in the ARM hypervisor 402 may determine, based on an ARM & RISC-V mapping table, a type of the exception or interrupt in the ARM architecture corresponding to the type of the exception or interrupt triggered in the RISC-V architecture, and store the status information of the exception or interrupt in the RISC-V architecture in one or more corresponding ARM registers 413.

The ARM & RISC-V mapping table may include an exception mapping table and an interrupt mapping table.

In the exception mapping table, a correspondence between code of one or more exceptions in the RISC-V architecture and code of one or more exceptions in the ARM architecture is recorded. Each correspondence recorded in the exception mapping table is code of a type of exception in the ARM specification and code of this type of exception in the RISC-V specification. Code of an exception indicates a type of the exception, and is unique for the exception of the type in an instruction set architecture, to distinguish different types of exceptions. Code of a type of exception in the RISC-V architecture indicates the type of the exception in a RISC-V instruction set specification. Code of a type of exception in the ARM architecture indicates the type of the exception in the ARM instruction set specification. Therefore, the RISC-V translation module 404 may translate, based on the exception mapping table, code of an exception in the secondary architecture into code of the exception that can be identified by the ARM hypervisor 402, and the ARM hypervisor 402 may identify a specific type of the exception in the secondary architecture.

The exception mapping table is further used to record a correspondence between the one or more RISC-V registers 414 and the one or more ARM registers 413, for example, a correspondence between a register that stores an instruction triggering the exception in the RISC-V architecture and a control and status register that is used to store an instruction triggering the exception in the ARM architecture, and a correspondence between a register that stores an address triggering the exception in the RISC-V architecture and a control and status register that is used to store an address triggering the exception in the ARM architecture, and a correspondence between a register that stores the code of the exception in the RISC-V architecture and a register that stores the code of the exception in the ARM architecture. Therefore, status information required for handling an exception may be stored in the ARM register 413, so that the ARM hypervisor 402 obtains, from the ARM register 413, the status information required for handling the exception and handles the exception.

In the interrupt mapping table, a correspondence between code of one or more types of interrupts in the RISC-V architecture and code of one or more types of interrupts in the ARM architecture is recorded. Each correspondence recorded in the interrupt mapping table is code of a type of interrupt in the ARM specification and code of this type of interrupt in the RISC-V specification. Code of an interrupt indicates a type of the interrupt, and is unique for the interrupt of the type in an instruction set architecture, to distinguish different types of interrupts. Code of a type of interrupt in the RISC-V architecture indicates the type of the interrupt in a RISC-V instruction set specification. Code of a type of interrupt in the ARM architecture indicates the type of the interrupt in the ARM instruction set specification. Therefore, the RISC-V translation module 404 may translate, based on the interrupt mapping table, code of an interrupt in the secondary architecture into code of the interrupt that can be identified by the ARM hypervisor 402, and the ARM hypervisor 402 may identify a specific type of the interrupt in the secondary architecture.

The interrupt mapping table is further used to record a correspondence between the RISC-V register 414 for storing code of an interrupt in the RISC-V architecture and the ARM register 413 for storing code of an interrupt in the ARM architecture. Therefore, status information required for handling an interrupt may be stored in the ARM register 413, so that the ARM hypervisor 402 obtains, from the ARM register 413, the status information required for handling the interrupt and handles the interrupt.

FIG. 5 shows a process of handling an exception triggered by the RISC-V virtual machine.

Step 501: When the RISC-V virtual machine triggers an exception, the processor 411 notifies the ARM hypervisor to handle the exception.

When the RISC-V virtual machine requests to access a GVA to obtain data stored in a memory, an MMU translates the GVA into a GPA and then translates the GPA into an HPA because the virtual machine needs to obtain data from the HPA. If an exception occurs during the translation from the GPA to the HPA, for example, a requested virtual address is invalid or valid with no physical page allocated to the virtual address (no mapping table from the GPA to the HPA is established), a page exception (Page Fault) fault may be triggered. The ARM hypervisor 402 does not support the RISC-V architecture and does not have an MMU that supports the RISC-V specification. Therefore, the exception cannot be handled in the RISC-V architecture and needs to be handled by the ARM hypervisor 402.

Step 502: The RISC-V virtual machine suspends execution and waits for the ARM hypervisor to handle the exception. The RISC-V processing logic 410 stores a system status in the shared memory.

The system status includes information in the control and status register, the general-purpose register, and the floating-point register. The general-purpose register and the floating-point register may store running status information of a vCPU of the RISC-V virtual machine, for example, data generated in an instruction operation process, a local variable temporarily applied by a system, and an intermediate result of floating-point calculation.

Code indicating that a type of the exception is a page fault exception and a virtual address (for example, a GVA) triggering the page fault exception may be separately stored in different RISC-V control and status registers (RISC-V registers 414). The address triggering the page fault exception is a virtual address that the RISC-V virtual machine 403 requests to access when the page fault exception is triggered.

In the shared memory 412, storage addresses are respectively configured for information in the control and status register, the general-purpose register, and the floating-point register. For example, an address range with an offset of 0x1000 to 0x13e0 relative to a start address of the shared memory 412 is used to store information in the general-purpose register and the floating-point register. An address range with an offset of 0x2000 to 0x11140 relative to the start address of the shared memory is used to store information in one or more control and status registers, that is, store the code of the page fault exception and the address triggering the page fault exception. Specifically, an address mapping table is configured in the shared memory 412, and the address mapping table stores addresses of the control and status register, the general-purpose register, and the floating-point register. The ARM hypervisor can read or update a value in the register based on a register address recorded in the address mapping table.

Step 503: The ARM hypervisor 402 obtains status information of the exception from the shared memory 412.

The RISC-V virtual machine generates the page fault exception. After the processor 411 notifies the ARM hypervisor 402 to handle the page fault exception, the ARM hypervisor writes an entry address of an exception handling function into a hardware register in the ARM architecture. The processor 411 reads the entry address of the exception handling function from the hardware register and obtains the status information of the exception from the shared memory 412.

The ARM hypervisor obtains, based on an address of the control and status register (the RISC-V register 414) recorded in the shared memory 412, code indicating the type of the exception triggered by the RISC-V virtual machine.

Step 504: The RISC-V translation module 404 searches, based on the exception mapping table, for a type of the exception in the ARM architecture corresponding to the type of the exception in the RISC-V architecture.

Because the RISC-V architecture and the ARM architecture have different definitions of codes indicating types of exceptions, code indicating the type of the exception triggered by the RISC-V virtual machine do not comply with the ARM architecture specification. Therefore, the ARM hypervisor 402 cannot directly identify the type of the exception triggered by the RISC-V virtual machine based on the code of the exception obtained from the shared memory. Therefore, the RISC-V translation module 404 searches for code of the exception that corresponds to the code of the exception that complies with the RISC-V architecture specification and that complies with the ARM architecture specification based on the exception mapping table, to identify the type of the exception triggered by the RISC-V virtual machine. The RISC-V architecture and the ARM architecture have different definitions of codes indicating types of exceptions. In other words, for an exception of a same type, different code values and code formats are used in the specifications of the two instruction set architectures. In the RISC-V architecture specification, an exception is indicated by using a format of two fields. Different from a definition of a code format of a page fault exception in the RISC-V architecture specification, four fields are used to indicate a page fault exception in the ARM architecture specification.

Figure 7:
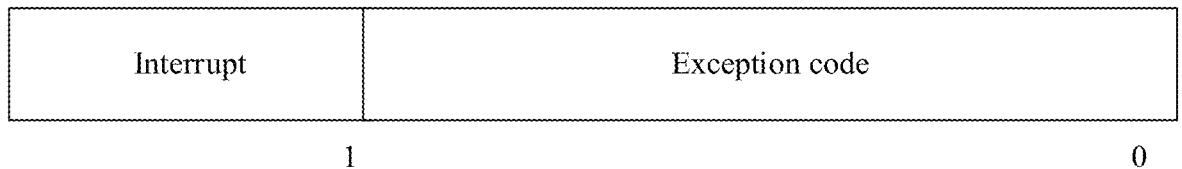
FIG. 7 is a schematic diagram of a structure of a scause register in a specification of a RISC-V architecture according to an embodiment of this application.

In the RISC-V architecture specification, code indicating a type of an exception or interrupt is stored in a scause register. FIG. 7 shows a structure of the scause register. When an interrupt value in bit 1 of the scause register is 1, it indicates an interrupt. When an interrupt value is 0, it indicates an exception. Exception code (exception code) in bit 0 of the scause register indicates a type of an exception or interrupt. A stage 2 instruction page fault exception is used as an example. An interrupt value in bit 1 of the scause register is 0, and a value of exception code in bit 0 of the scause register is 20. To be specific, code of the stage 2 instruction page fault exception is interrupt=(0) and exception code=(20).

Figure 8:
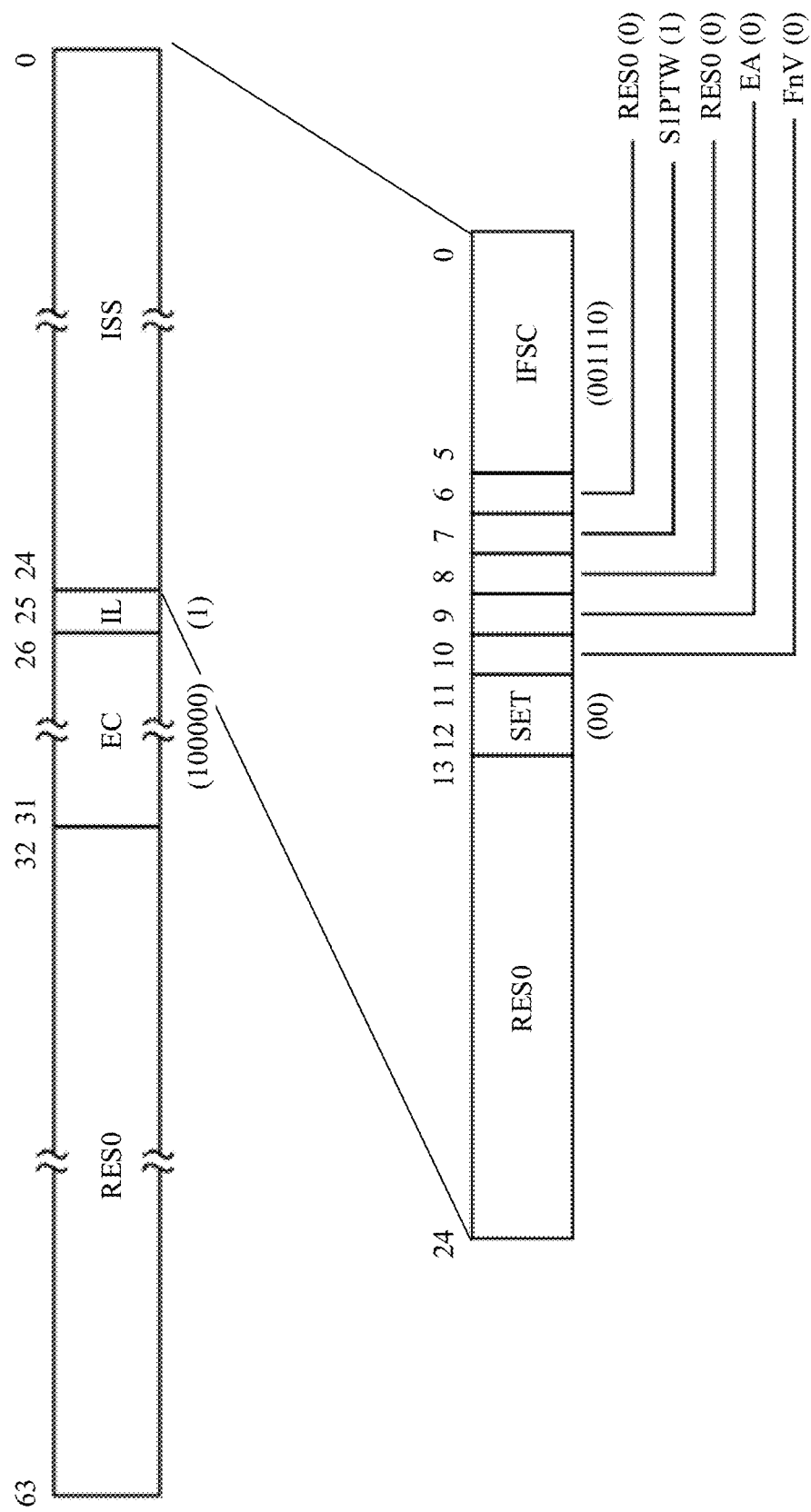
FIG. 8 is a schematic diagram of a structure of an esr_el2 register in a specification of an ARM architecture according to an embodiment of this application.

In the ARM architecture specification, code indicating a type of an exception or interrupt is stored in an esr_el2 register. FIG. 8 shows a structure of the esr_el2 register. RES0 is a reserved field and a value of RES0 is usually 0. An exception class (EC) field indicates an exception category. An instruction length for synchronous exception (IL) field indicates an instruction length. An instruction specific syndrome (ISS) field is used to record a subclass and a special field under an exception category. A page fault exception is used as an example. Code of the stage 2 instruction page fault exception in the ARM architecture is "RES0=(0x0), EC=(0x20), IL=(0x1), and ISS=(0x8E)".

In the RISC-V architecture specification, a register used to store an address triggering the exception is a htval register. In the ARM architecture specification, a register used to store an address triggering the exception is an hpfar_el2 register.

The scause register, esr_el2 register, htval register, and hpfar_el2 register are control and status registers used to store different information.

In the exception mapping table, correspondences between code of a plurality of types of exceptions in the RISC-V architecture and code of a plurality of types of exceptions in the ARM architecture is recorded. Code of an exception indicates a type of the exception. In the table, code of an exception in the RISC-V architecture corresponds to code of an exception in the ARM architecture, each of the plurality of correspondences indicates a correspondence between code of a type of exception in the RISC-V architecture and code of a type of exception in the ARM architecture.

The stage 2 instruction page fault exception is used as an example. In the exception mapping table, a correspondence between code of the exception "interrupt=(0), and exception code=(20)" and code of the exception "RES0=(0x0), EC=(0x20), EL=(0x1), and ISS=(0x8E)" is recorded.

The RISC-V translation module 404 obtains the code "interrupt=(0), and exception code=(20)" of the stage 2 instruction page fault exception in the RISC-V architecture from the shared memory 412, and finds the code "RES0=(0x0), EC=(0x20), EL=(0x1), and ISS=(0x8E)" corresponding to the code "interrupt=(0), and exception code=(20)" based on the exception mapping table. The code "RES0=(0x0), EC=(0x20), EL=(0x1), and ISS=(0x8E)" complies with the ARM architecture specification. Therefore, the ARM hypervisor 402 can identify, based on the code, that the type of the exception triggered in the RISC-V architecture is the stage 2 instruction page fault exception.

Step 505: The exception simulation module 406 writes the translated exception code, an instruction triggering the exception, and an address triggering the exception into a corresponding ARM register or into a memory that can be accessed by the ARM hypervisor.

In an implementation, to minimize changes to original code of the ARM architecture and avoid excessive intrusive modifications, a translation module in the ARM hypervisor writes the translated exception code, the instruction triggering the exception, and the address triggering the exception into the ARM register. In this way, the exception simulation module 406 in the ARM hypervisor can obtain the foregoing information required for handling the exception from the ARM register.

In the exception mapping table, a correspondence between a register for storing the exception code in the RISC-V architecture and a register for storing the exception code in the ARM architecture, and a correspondence between a register for storing the address triggering the exception in the RISC-V architecture and a register for storing the exception code in the ARM architecture are recorded. The stage 2 instruction page fault exception is used as an example. In the exception mapping table, a correspondence between the scause register and the esr_el2 register and a correspondence between the htval register and the hpfar_el2 register are recorded. Therefore, the exception simulation module 406 may write code corresponding to code stored in the scause register into the esr_el2 register, that is, write the code "RES0=(0x0), EC=(0x20), EL=(0x1), and ISS=(0x8E)" into the esr_el2 register, and write a value (the address triggering the exception) in the htval register obtained from the shared memory into the hpfar_el2 register. The code and the address triggering the exception are written into corresponding fields in the register according to the ARM architecture specification.

In a special scenario of a page fault exception, a page fault exception is triggered by accessing memory address space MMIO. To handle this type of exception, the ARM hypervisor needs to obtain an instruction triggering the exception. In the RISC-V architecture, the instruction triggering the exception is stored in a htinst register (a type of control and status register). The ARM architecture does not have a register that corresponds to the htinst register and that is dedicated to storing the instruction triggering the exception. Therefore, the ARM hypervisor may store information that is about the instruction triggering the exception and that is read from the shared memory of the ARM & RISC-V in the general-purpose register or a memory allocated to the ARM hypervisor.

In another implementation, the ARM hypervisor writes the translated exception code, the instruction triggering the exception, and the address triggering the exception into a memory that can be accessed by the ARM hypervisor, so that the exception simulation module 406 can directly obtain information required for handling the exception.

In an example, an invalid instruction exception is triggered by an instruction when the RISC-V virtual machine executes a TLB refresh instruction or an EBREAK. Status information of the exception includes a type of the exception, an instruction triggering the exception, and parameter information (for example, an address space identifier (Address Space Identifier, ASID) and a virtual address range) attached to the instruction. According to the ARM architecture specification, the exception simulation module writes the foregoing information to a register for storing the information in the ARM architecture or stores the information in a memory.

Step 506: The ARM hypervisor identifies and handles the exception based on the code of the exception.

The translated exception code is the code of the exception triggered by the RISC-V virtual machine in the ARM architecture. Therefore, the ARM hypervisor identifies and handles the exception triggered by the RISC-V virtual machine based on the translated exception code.

A page fault exception is used as an example. The exception simulation module 406 invokes data abort (data abort) exception processing logic of the ARM hypervisor to handle the page fault exception triggered when a virtual machine in the RISC-V architecture accesses a GVA. For example, if the page fault exception occurs because an exception occurs in a process of translating the GPA to an HPA, the ARM hypervisor establishes a mapping relationship from the GPA to the HPA. The mapping relationship may be recorded in a stage 2 address translation page table. The stage 2 address translation page table is used to translate the GPA to the HPA in an MMU in the ARM architecture. The processor re-executes the instruction triggering the page fault exception or re-accesses the address triggering the page fault exception. In this case, the MMU may find the HPA by using a re-established stage 2 address translation page table indicating the mapping relationship from the GPA to the HPA, and obtain data stored in the memory. Therefore, the stage 2 address translation page table in the hardware-assisted virtualization technology is reused to accelerate memory data access.

For example, if an exception is triggered by the TLB refresh instruction, the ARM hypervisor may use an existing processing manner to complete a TLB refresh operation on the RISC-V virtual machine. For an invalid instruction exception triggered by an ECALL indicator, an ECALL instruction in the RISC-V architecture that triggers the exception is parsed to obtain an invoking type and an input parameter of the ECALL instruction. A software-only simulation manner is used to simulate execution of the ECALL instruction in the RISC-V architecture.

For an exception that is in the RISC-V architecture and that does not have a same or similar exception handling function in the ARM hypervisor, for example, an exception triggered by an ECALL instruction, an exception triggered by a privileged instruction specific to the RISC-V architecture, and an exception for accessing address space of a virtual device, the exception in the RISC-V architecture is simulated in the ARM hypervisor in the software-only simulation manner according to the RISC-V architecture hardware specification. An ECALL instruction exception is used as an example. The exception is triggered when an interface provided by a virtual machine monitor in the RISC-V architecture is invoked to implement a function. The system does not support the virtual machine monitor in the RISC-V architecture, and the ARM hypervisor does not have this interface. In this case, an interface with the same function is implemented in the ARM hypervisor by referring to a definition in the RISC-V architecture.

Step 507: The ARM hypervisor stores a handling result of the exception in the shared memory, and transfers the handling result to the RISC-V virtual machine.

For a page fault exception, the handling result is data in the memory to be accessed by the RISC-V virtual machine when the page fault exception is triggered. The ARM hypervisor stores the data to be accessed by the RISC-V virtual machine in the shared memory and transfers the data to the RISC-V virtual machine. The RISC processing logic restores a status of the RISC-V virtual machine and continues to run the RISC-V virtual machine.

For a same type of exception, different code is used to indicate the type of the exception in different instruction set architectures. Therefore, the ARM hypervisor cannot directly identify the type of the exception triggered by the RISC-V virtual machine. In this embodiment of this application, by storing a one-to-one correspondence between code of a plurality of types of exceptions defined by the ARM architecture and code of a plurality of types of exceptions defined by the RISC-V architecture, the ARM hypervisor may find code that is of the type of the exception triggered by the RISC-V virtual machine and that is in the ARM architecture, so that the ARM hypervisor may identify the type of the exception triggered by the RISC-V virtual machine. In other words, the ARM hypervisor finds, based on RISC-V code indicating the type of the exception triggered by the RISC-V virtual machine and the correspondence, ARM code indicating the type of the exception triggered by the RISC-V virtual machine. The RISC-V code is code of this type of exception in the RISC-V architecture specification, and the ARM code is code of this type of exception in the ARM architecture specification. The ARM hypervisor can directly identify the ARM code to determine the exception type.

FIG. 6 shows a process of handling an interrupt triggered by a RISC-V virtual machine.

Step 601: When the RISC-V virtual machine triggers an interrupt, the processor 411 notifies the ARM hypervisor to handle the interrupt.

In the architecture of this application, because the hardware layer does not have an interrupt controller that complies with the RISC-V specification, when the ARM interrupt controller 408 sends a physical interrupt to the RISC-V processing logic 410 or the vCPU 1 of the RISC-V virtual machine sends an inter-core interrupt to the vCPU 2, the RISC-V processing logic 410 needs to notify the ARM hypervisor 402 to handle the interrupt. An interrupt triggered by the RISC-V virtual machine include the physical interrupt received by the RISC-V processing logic 410 and a virtual interrupt received by a virtual processor in the RISC-V virtual machine.

Step 602: The RISC-V virtual machine suspends execution and waits for the ARM hypervisor to handle the interrupt. The RISC-V processing logic stores a current system status in the shared memory.

The system status includes information stored in hardware registers such as a general-purpose register, a floating-point register and a control and status register in the RISC-V architecture. The control and status register stores status information of an interrupt required for handling the interrupt. In the RISC-V architecture, the control and status register (the RISC-V register 414) is specifically a virtual supervisor interrupt register (Virtual Supervisor Interrupt Register, VSIP). The general-purpose register and the floating-point register may store status information of a current vCPU of the RISC-V virtual machine, for example, data in an instruction operation process, a local variable temporarily applied, and an intermediate result of floating-point calculation. The status information of the vCPU stored in the general-purpose register and the floating-point register may be used when the RISC-V virtual machine 403 switches the vCPU.

The status information of the interrupt includes a type of the interrupt, and specifically, includes code indicating the type of the interrupt, and the code complies with the RISC-V architecture specification. The RISC-V processing logic reads the code indicating the type of the interrupt from the RISC-V control and status register 414 and stores the code in the shared memory 412.

In the shared memory 412, storage addresses are respectively configured for information in the control and status register, the general-purpose register, and the floating-point register. For example, an address range with an offset of 0x1000 to 0x13e0 relative to a start address of the shared memory 412 is used to store information in the general-purpose register and the floating-point register. An address range with an offset of 0x2000 to 0x11140 relative to the start address of the shared memory is used to store information in one or more control and status registers, that is, store the code indicating the type of the interrupt. Specifically, an address mapping table is configured in the shared memory 412, and the address mapping table stores addresses of the control and status register, the general-purpose register, and the floating-point register. The ARM hypervisor can read or update a value in the register based on a register address recorded in the address mapping table.

Step 603: The ARM hypervisor obtains the status information of the interrupt from the shared memory.

The ARM hypervisor obtains, based on an address of the control and status register (the RISC-V register 414) recorded in the shared memory 412, code indicating the type of the interrupt triggered by the RISC-V virtual machine.

Step 604: The RISC-V translation module searches, in the interrupt mapping table, for a type of the interrupt in the ARM architecture corresponding to the type of the interrupt in the RISC-V architecture.

The RISC-V interrupt type may be identified as a timer interrupt, a software interrupt, or an external interrupt. The inter-core interrupt is a type of software interrupt.

Because the RISC-V architecture and the ARM architecture have different definitions of codes indicating types of interrupts, code indicating the type of the interrupt triggered by the RISC-V virtual machine do not comply with the ARM architecture specification. Therefore, the ARM hypervisor 402 cannot directly identify the type of the interrupt triggered by the RISC-V virtual machine based on the code of the interrupt obtained from the shared memory. Therefore, the RISC-V translation module 404 searches for code of the interrupt that corresponds to the code of the interrupt that complies with the RISC-V architecture specification and that complies with the ARM architecture specification based on the interrupt mapping table, to identify the type of the interrupt triggered by the RISC-V virtual machine. The RISC-V architecture and the ARM architecture have different definitions of codes indicating types of interrupts. In other words, for an interrupt of a same type, different code values and code formats are used in the specifications of the two instruction set architectures.

In the interrupt mapping table, a correspondence between code of a plurality of types of interrupts in the RISC-V architecture and code of a plurality of types of interrupts in the ARM architecture is recorded. Code of an interrupt indicates a type of the interrupt. In the interrupt mapping table, code of an interrupt in the RISC-V architecture corresponds to code of the interrupt in the ARM architecture.

Step 605: Write translated code of the interrupt into a corresponding ARM register or into a memory that can be accessed by the ARM hypervisor.

In an implementation, to minimize changes to original code of the ARM architecture and avoid excessive intrusive modifications, a translation module in the ARM hypervisor writes the translated interrupt code into the ARM register. In this way, the interrupt simulation module 407 in the ARM hypervisor can obtain the foregoing information required for handling the interrupt from the ARM register.

In the interrupt mapping table, a correspondence between a register for storing code of an interrupt in the RISC-V architecture and a register for storing code of an interrupt in the ARM architecture is recorded.

Step 606: The ARM hypervisor identifies and handles the interrupt based on the translated code of the interrupt.

The translated interrupt code is the code of the interrupt triggered by the RISC-V virtual machine in the ARM architecture. Therefore, the ARM hypervisor identifies and handles the interrupt triggered by the RISC-V virtual machine based on the translated interrupt code.

The interrupt simulation module obtains an ID of a RISC-V virtual processor, obtains a physical processor or physical core in which the virtual processor is located based on the ID of the virtual processor, and notifies the physical processor or physical core by using the ARM interrupt controller. The interrupt simulation module maintains a mapping relationship between a RISC-V virtual interrupt and a RISC-V virtual processor, and a mapping relationship between the RISC-V virtual processor and a physical processor/core.

The interrupt simulation module maintains a priority sequence of RISC-V virtual interrupts for each RISC-V virtual processor. When a plurality of interrupts are simultaneously sent to a virtual processor, the interrupt simulation module obtains an interrupt with a highest priority according to the maintained priority sequence. The interrupt simulation module obtains, based on the virtual interrupt mapping relationship, a physical processor/core in which the RISC-V virtual processor is located. The ARM interrupt controller sends an interrupt notification to the physical processor/core. The ARM hypervisor configures the interrupt with the highest priority to the hardware register of the RISC-V processing logic to deliver the virtual interrupt.

When the ARM hypervisor identifies that the RISC-V virtual machine triggers an inter-core interrupt, the interrupt simulation module parses obtained status information of the interrupt, identifies that the interrupt is an inter-core interrupt, and sends the interrupt to the VCPU 2. The interrupt simulation module learns, based on the virtual interrupt mapping relationship, that the vCPU 2 is located on a physical core 2, and the ARM interrupt controller sends the inter-core interrupt to the physical core 2, to complete the inter-core interrupt triggered by the RISC-V virtual machine.

When the ARM hypervisor identifies that the RISC-V virtual machine triggers a timer interrupt, the ARM hypervisor sets supervisor timer interrupt pending (Supervisor Time Interrupt Pending, STIP) of the RISC-V VSIP (the RISC control and status register) to 1, to complete delivery of the RISC-V timer interrupt.

When the ARM hypervisor identifies that the RISC-V virtual machine triggers a software interrupt, the ARM hypervisor sets supervisor software interrupt pending (Supervisor Software Interrupt Pending. SSIP) of the VSIP register of the RISC-V processing logic to 1, to complete delivery of the RISC-V software interrupt.

When the ARM hypervisor identifies that the RISC-V virtual machine triggers an external interrupt, the ARM hypervisor sets supervisor external interrupt pending (Supervisor external interrupt pending. SEIP) of the VSIP register of the RISC-V processing logic to 1, to complete delivery of the RISC-V external interrupt.

Because an address mapping table is configured in the shared memory 412, the address mapping table stores an address of the control and status register (for example, the VSIP), the SSIP, the STIP, and the SEIP are located in different bits in the VSIP, and setting the SSIP, the STIP, or the SEIP to 1 indicates that a value of a corresponding bit is set to 1, indicating that a corresponding interrupt is waiting for handling. The ARM hypervisor may set a value of the SSIP, STIP, or SEIP in the VSIP to 1 based on a VSIP address recorded in the address mapping table, so that the RISC processing logic triggers a corresponding interrupt based on the value of the bit in the VSIP. For example, if a STIP bit is set to 1, the ARM hypervisor sets a STIP value in the VSIP to 1 based on the VSIP address in the address mapping table, indicating that the timer interrupt is waiting for handling. The RISC processing logic reads the STIP value in the VSIP and learns that the interrupt type triggered by the RISC-V virtual machine is a timer interrupt.

Step 607: The RISC processing logic restores a status of the RISC-V virtual machine, and continues to run the RISC-V virtual machine.

The RISC processing logic reads the value of SSIP, STIP, or SEIP in the VSIP to obtain the type of the interrupt triggered by the RISC-V.

For a same type of interrupt, different code is used to indicate the type of the interrupt in different instruction set architectures. Therefore, the ARM hypervisor cannot directly identify the type of the interrupt triggered by the RISC-V virtual machine. In this embodiment of this application, by storing a one-to-one correspondence between code of a plurality of types of interrupts defined by the ARM architecture and code of a plurality of types of interrupts defined by the RISC-V architecture, the ARM hypervisor may find code that is of the type of the interrupt triggered by the RISC-V virtual machine and that is in the ARM architecture, so that the ARM hypervisor may identify the type of the interrupt triggered by the RISC-V virtual machine. In other words, the ARM hypervisor finds, based on RISC-V code indicating the type of the interrupt triggered by the RISC-V virtual machine and the correspondence, ARM code indicating the type of the interrupt triggered by the RISC-V virtual machine. The RISC-V code is code of this type of interrupt in the RISC-V architecture specification, and the ARM code is code of this type of interrupt in the ARM architecture specification. The ARM hypervisor can directly identify the ARM code to determine the interrupt type.

In another implementation, for an exception or interrupt triggered by the RISC-V virtual machine, there is no code of the exception or the interrupt in the ARM architecture specification. In this case, the following handling manners may be used:
  (1) Code of this type of exception or interrupt is customized in the ARM architecture according to the ARM encoding specification. A correspondence between code of this type of exception or interrupt in the RISC-V architecture and the customized code of this type of exception or interrupt in the ARM architecture is added to the exception mapping table or interrupt mapping table.
  (2) A functional module is added to the ARM hypervisor. The functional module is similar to a hypervisor supporting the RISC-V architecture. Therefore, the functional module can handle the exception or interrupt triggered by the RISC-V virtual machine by referring to processing logic when the RISC-V hypervisor directly handles the exception or interrupt, without code mapping.

Figure 9:
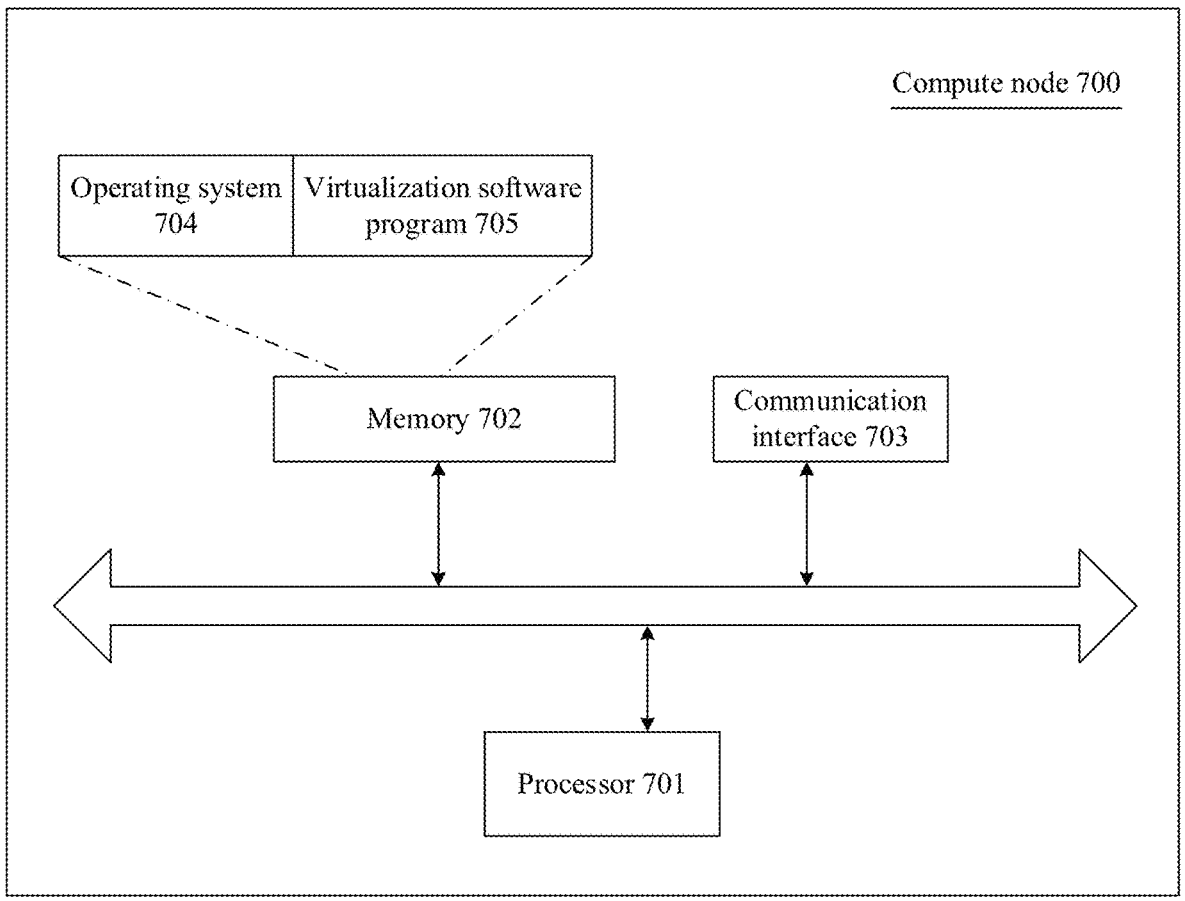
FIG. 9 is a schematic diagram of a structure of still yet another compute node 700 according to an embodiment of this application.

FIG. 9 is a schematic diagram of a structure of still yet another compute node 700. The compute node 700 may be some or all of the compute node 100, 203, 300, or 400. The compute node 700 includes a processor 701, a memory 702, and a communication interface 703.

The processor 701 is a control center of the compute node 700, and is connected to components of the compute node 700 through various interfaces and buses. In some embodiments, the processor 701 may include one or more processing units, which may alternatively be referred to as physical cores. For example, the processor 114 in FIG. 1 includes the core 0 and the core 1. In some embodiments, the processor 701 may include primary architecture processing logic and secondary architecture processing logic, for example, the primary architecture processing logic 309 and the secondary architecture processing logic 310 in FIG. 3, and ARM processing logic 409 and RISC-V processing logic 410 in FIG. 4. The processor 701 may further include a register. The register may be configured to store status information of a triggered exception or interrupt. In addition, in some embodiments, the primary architecture processing logic and the secondary architecture processing logic have respective registers, and the register of the primary architecture processing logic may be configured to store translated status information of an exception or interrupt. The processor 701 may be a central processing unit (Central Processing Unit, CPU), or the processor 701 may be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, or the processor 701 may be any conventional processor, or the like.

The memory 702 stores a computer program. The processor 701 is configured to execute a computer program in the memory 702, to implement a function defined by the computer program. The memory 702 is a non-volatile storage medium, and generally includes an internal memory and an external memory. The internal memory includes but is not limited to a random access memory (Random Access Memory, RAM), a read-only memory (Read-Only Memory, ROM), a cache (cache), or the like. The external memory includes but is not limited to a flash memory (flash memory), a hard disk, a compact disc, a universal serial bus (universal serial bus, USB) flash drive, and the like. The computer program is usually stored in the external memory. Before executing the computer program, the processor loads the program from the external memory to the internal memory. The memory 702 may be independent and is connected to the processor 701 through a bus. The memory 702 may alternatively be integrated with the processor 701 into a chip subsystem.

The memory 702 stores an operating system 704, a virtualization software program 705, and another program module. The operating system 704 may be an operating system of the compute node 700, for example, the host operating system 111 shown in FIG. 1. After a virtualization software program 705 is read and run by the processor 701, virtualization of the compute node 700 is implemented, and a method for handling an exception or interrupt by a virtual machine supporting a heterogeneous instruction set architecture provided in embodiments of this application is implemented. The virtualization software program 705 may implement some or all functions of the virtual machine monitor 110 in FIG. 1, the virtualization platform in FIG. 2, the virtual machine monitor 303 in FIG. 3, or the ARM hypervisor 402 in FIG. 4.

The communication interface 703 is a transceiver apparatus such as a transceiver to implement communication between the compute node 700 and another device or a communication network.

Figure 10:
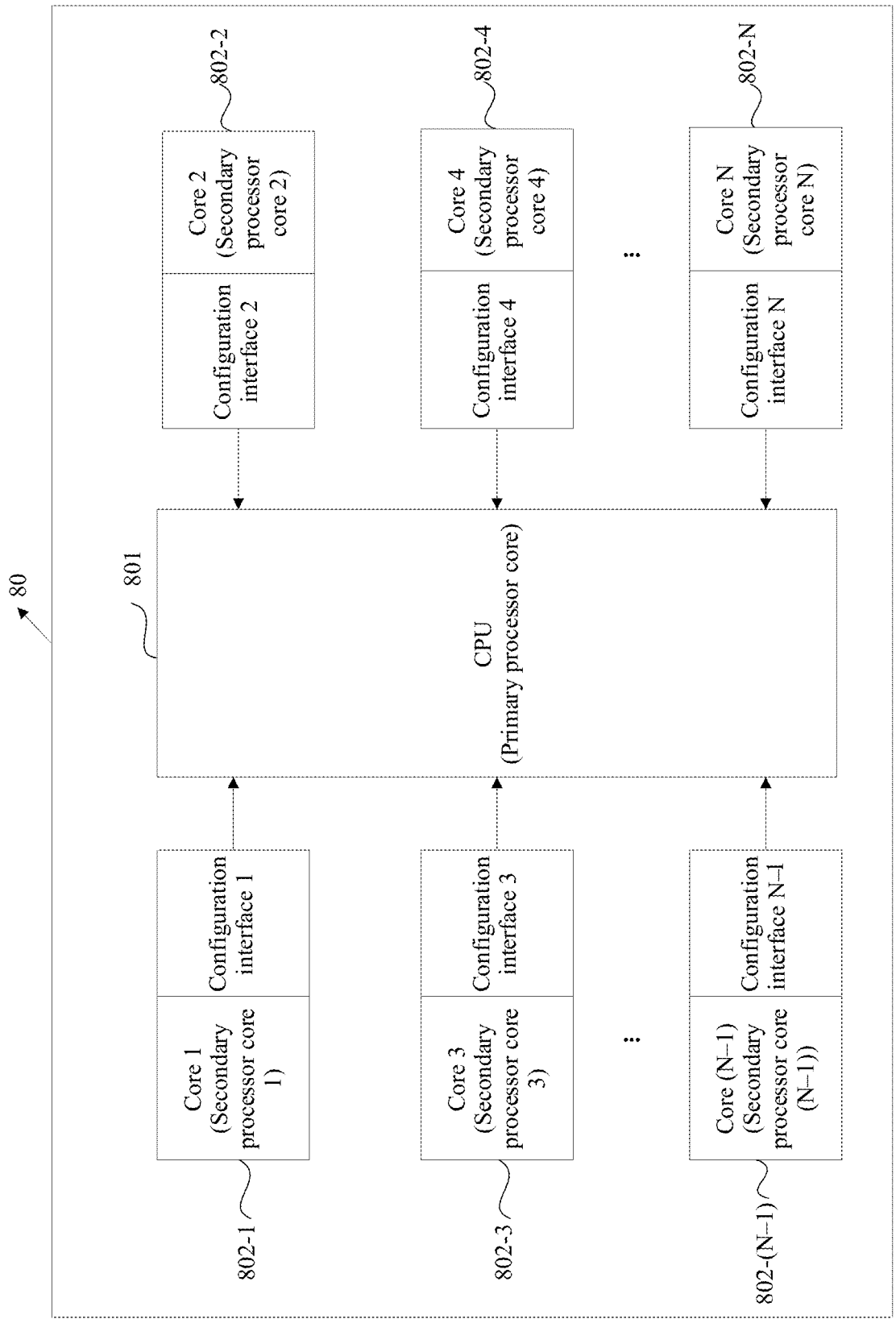
FIG. 10 is a schematic diagram of a structure of a multi-core processor 80 according to an embodiment of this application.

FIG. 10 is a schematic diagram of a structure of a multi-core processor according to the foregoing embodiments. The multi-core processor 10 may be located in any electronic device, for example, various devices such as a PC, a computer, a mobile phone, and a tablet computer. The multi-core processor 10 may be specifically a chip, a chip set, or a circuit board on which a chip or a chip set is mounted. The chip, the chipset, or the circuit board with the chip or the chipset may work when driven by necessary software.

The multi-core processor 80 may include a primary processor core 801 and one or more secondary processor cores 802 coupled to the primary processor core 801. The primary processor core is equivalent to the foregoing primary architecture processing logic, and the secondary processor core is equivalent to the foregoing secondary architecture processing logic. There may be N secondary processor cores 802, including a secondary processor core 1 (a core 1), a secondary processor core 2 (a core 2), a secondary processor core 3 (a core 3), a secondary processor core 4 (a core 4), . . . , a secondary processor core (N–1) (a core (N–1)), and a secondary processor core N (a core N). The N secondary processor cores 802 each include a configuration interface, respectively: a configuration interface 1, a configuration interface 2, a configuration interface 3 . . . a configuration interface N–1, and a configuration interface N. The primary processor core 801 may perform related configuration and control on a corresponding secondary processor core 802 through a corresponding configuration interface. Optionally, the primary processor core 801 and the one or more secondary processor cores 802 may be located in one or more ICs. For example, the primary processor core 801 and the one or more secondary processor cores 802 may be located in one integrated circuit (Integrated Circuit, IC). Alternatively, the primary processor core 801 is located in one IC, and some or all of the one or more secondary processor cores 802 are located in another IC. This is not specifically limited in embodiments of the present invention. It may be understood that the primary processor core 801 and the N secondary processor cores 802 may communicate with each other through coupling by using a bus or in another manner. A connection relationship shown in FIG. 10 does not constitute a limitation on a coupling relationship between the primary processor core 801 and the N secondary processor cores 802.

The primary processor core 801 and the N secondary processor cores 802 support different instruction set architectures. The primary processor core 801 supports a first instruction set, and the secondary processor core 802 supports a second instruction set. Optionally, the primary processor core 801 and any secondary processor core 802 of the N secondary processor cores 802 are heterogeneous. In other words, the first instruction set supported by the primary processor core 801 is different from the second instruction set supported by the any secondary processor core 802. The N secondary processor cores 802 may be homogeneous or heterogeneous, or some may be homogeneous or heterogeneous. In other words, the instruction sets respectively supported by the N secondary processor cores 802 may be the same or different, or some may be the same or different. This is not specifically limited in embodiments of the present invention. For example, in an application scenario, the primary processor core 801 is a general-purpose processor core, and the N secondary processor cores 802 are processor cores with a plurality of specific functions. For example, the primary processor core is a general-purpose CPU, and the secondary processor cores 802 are an FPGA, a DSP, and the like. In other words, each secondary processor core 802 has a unique structure. Therefore, each secondary processor core has a unique instruction set, and a specific instruction set determines a specific application of each secondary processor core, so that each secondary processor core has a type of program that the secondary processor core is good at processing. Therefore, the primary processor core 801 may allocate different types of computing tasks to different types of secondary processor cores 802 for parallel processing. Therefore, functions of different specific applications are implemented in a same processor at the same time, to provide a more flexible and efficient processing mechanism for applications with different requirements.

Optionally, the first instruction set is an ARM instruction set, and the second instruction set is a RISC-V instruction set. For example, both of the primary processor core 801 and the N secondary processor cores 802 are CPU cores, but support different instruction sets. For example, the primary processor core 801 supports an ARM instruction set, and the secondary processor core 102 supports an RISC-V instruction set. Therefore, the primary processor core 801 may be configured to install and run a virtual machine monitor and a virtual machine that are based on an ARM instruction set, and the secondary processor core 802 may run, under control of the primary processor core 101, an application that is based on an RISC-V instruction set, for example, a virtual machine that is based on an RISC-V instruction set, to support a virtual machine of a heterogeneous instruction set in a same processor, namely the multi-core processor 80.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

What is claimed is:

1. A method for handling an exception, wherein the method comprises:
when a secondary architecture virtual machine triggers an exception, obtaining, by a virtual machine monitor of a physical host that comprises a primary processor core supporting a primary instruction set architecture and a secondary processor core supporting a secondary instruction set architecture, status information of the exception from a shared memory that is shared by the secondary processor core and the primary processor core, wherein the status information of the exception comprises first code of the exception, and the first code of the exception indicates a type of the exception in the secondary instruction set architecture, wherein the physical host further comprises a secondary architecture register, and wherein the status information of the exception is copied by the secondary processor core from the secondary architecture register to the shared memory, and the secondary architecture register is a register that complies with a specification of the secondary instruction set architecture and that is configured to store the status information of the exception;
obtaining, by the virtual machine monitor, second code of the exception from an exception mapping relationship, wherein the second code of the exception indicates a type of the exception in the primary instruction set architecture, and the exception mapping relationship comprises a correspondence between first code and second code of each type of exception among a plurality of types of exceptions; and identifying, by the virtual machine monitor, the type of the exception based on the second code of the exception, and handling the exception.

2. The method according to claim 1, wherein the physical host further comprises a shared register, and the obtaining, by the virtual machine monitor, status information of the exception comprises:

obtaining, by the virtual machine monitor, the status information of the exception from the shared register, wherein the shared register is shared by the secondary processor core and the primary processor core, and the shared register stores the status information of the exception.

3. The method according to claim 1, wherein the physical host further comprises a primary architecture register, the status information of the exception further comprises at least one of an instruction triggering the exception or an address triggering the exception, the exception mapping relationship further comprises a correspondence between the secondary architecture register and the primary architecture register, the primary architecture register is a register that complies with a specification of the primary instruction set architecture, before the identifying, by the virtual machine monitor, the type of the exception based on the second code of the exception, and handling the exception, the method further comprises:

searching, by the virtual machine monitor based on the exception mapping relationship, for the primary architecture register corresponding to the secondary architecture register; and writing, by the virtual machine monitor, the second code of the exception into the primary architecture register, and at least one of the instruction triggering the exception and the address triggering the exception into the primary architecture register; and the identifying, by the virtual machine monitor, the type of the exception based on the second code of the exception, and handling the exception comprises:

reading, by the virtual machine monitor from the primary architecture register, the second code of the exception and at least one of the instruction triggering the exception and the address triggering the exception; and handling, by the virtual machine monitor, the exception based on the second code of the exception and at least one of the instruction triggering the exception and the address triggering the exception.

4. The method according to claim 1, wherein the physical host comprises a hardware device supporting hardware-assisted virtualization, the hardware device supports the primary instruction set architecture, and the handling, by the virtual machine monitor, the exception comprises:

handling, by the virtual machine monitor, the exception by using the hardware device supporting hardware-assisted virtualization.

5. A method for handling an interrupt, wherein the method comprises:

when a secondary architecture virtual machine triggers an interrupt, obtaining, by a virtual machine monitor of a physical host that comprises a primary processor core supporting a primary instruction set architecture and a secondary processor core supporting a secondary instruction set architecture, status information of the interrupt from a shared memory that is shared by the secondary processor core and the primary processor core, wherein the status information comprises first code of the interrupt, and the first code of the interrupt indicates a type of the interrupt in the secondary instruction set architecture, wherein the physical host comprises a secondary architecture register, and the status information of the interrupt is copied by the secondary processor core from the secondary architecture register to the shared memory, and the secondary architecture register is a register that complies with a specification of the secondary instruction set architecture and that is configured to store the status information of the interrupt;

obtaining, by the virtual machine monitor, second code of the interrupt from an interrupt mapping relationship, wherein the second code of the interrupt indicates a type of the interrupt in the primary instruction set architecture, and the interrupt mapping relationship comprises a correspondence between first code and second code of each type of interrupt among a plurality of types of interrupts; and identifying, by the virtual machine monitor, the type of the interrupt based on the second code of the interrupt, and handling the interrupt.

6. The method according to claim 5, wherein the physical host further comprises a shared register, and the obtaining, by the virtual machine monitor, status information of the interrupt comprises:

obtaining, by the virtual machine monitor, the status information of the interrupt from the shared register, wherein the shared register is shared by the secondary processor core and the primary processor core, and the shared register stores the status information of the interrupt.

7. The method according to claim 5, wherein the physical host comprises a primary architecture register, the interrupt mapping relationship further comprises a correspondence between the secondary architecture register and the primary architecture register, the primary architecture register is a register that complies with a specification of the primary instruction set architecture;

before the identifying, by the virtual machine monitor, the type of the interrupt based on the second code of the interrupt, and handling the interrupt, the method further comprises:

searching, by the virtual machine monitor based on the interrupt mapping relationship, for the primary architecture register corresponding to the secondary architecture register; and writing, by the virtual machine monitor, the second code of the interrupt into the primary architecture register; and the identifying, by the virtual machine monitor, the type of the interrupt based on the second code of the interrupt, and handling the interrupt comprises:

reading, by the virtual machine monitor, the second code of the interrupt from the primary architecture register, and identifying the type of the interrupt based on the second code of the interrupt, and handling the interrupt.

8. The method according to claim 5, wherein the physical host comprises a hardware device supporting hardware-assisted virtualization, the hardware device supports the primary instruction set architecture, and the handling, by the virtual machine monitor, the interrupt comprises:

handling, by the virtual machine monitor, the interrupt by using the hardware device supporting hardware-assisted virtualization.

9. A physical host, wherein the physical host comprises:
at least one processor; and
one or more memories coupled to the at least one processor and storing programming instructions for execution by the at least one processor to cause the physical host to:
when a secondary architecture virtual machine triggers an exception, obtain status information of the exception from a shared memory that is shared by a secondary processor core and a primary processor core of the physical host, wherein the status information of the exception comprises first code of the exception, the first code of the exception indicates a type of the exception in a secondary instruction set architecture, and the secondary architecture virtual machine is a virtual machine that supports the secondary instruction set architecture and that runs on the physical host, wherein the physical host further comprises a secondary architecture register, and, the status information of the exception is copied from the secondary architecture register to the shared memory, and the secondary architecture register is a register that complies with a specification of the secondary instruction set architecture and that is configured to store the status information of the exception triggered by the secondary architecture virtual machine; and
obtain second code of the exception from an exception mapping relationship, wherein the second code of the exception indicates a type of the exception in a primary instruction set architecture, and the exception mapping relationship comprises a correspondence between first code and second code of each type of exception among a plurality of types of exceptions; and
identify the type of the exception based on the second code of the exception, and handle the exception.

10. The physical host according to claim 9, wherein the physical host further comprises a shared register, and the programming instructions, when executed by the at least one processor, cause the physical host to obtain the status information of the exception from the shared register, wherein the shared register is shared by a secondary processor core and a primary processor core, and the shared register stores the status information of the exception.

11. The physical host according to claim 9, wherein the physical host further comprises a primary architecture register, the status information of the exception further comprises at least one of an instruction triggering the exception or an address triggering the exception, the exception mapping relationship further comprises a correspondence between the secondary architecture register and the primary architecture register, the primary architecture register is a register that complies with a specification of the primary instruction set architecture;

the programming instructions, when executed by the at least one processor, cause the physical host to: search, based on the exception mapping relationship, for the primary architecture register corresponding to the secondary architecture register; and write the second code of the exception into the primary architecture register, and at least one of the instruction triggering the exception and the address triggering the exception into the primary architecture register; and read, from the primary architecture register, the second code of the exception and at least one of the instruction triggering the exception and the address triggering the exception; and handle the exception based on the second code of the exception and at least one of the instruction triggering the exception and the address triggering the exception.

12. The physical host according to claim 9, wherein the physical host comprises a hardware device supporting hardware-assisted virtualization, and the hardware device supports the primary instruction set architecture; and the programming instructions, when executed by the at least one processor, cause the physical host to handle the exception by using the hardware device supporting hardware-assisted virtualization.

13. A physical host, wherein the physical host comprises:
at least one processor; and
one or more memories coupled to the at least one processor and storing programming instructions for execution by the at least one processor to cause the physical host to:
when a secondary architecture virtual machine triggers an interrupt, obtain status information of the interrupt from a shared memory that is shared by a secondary processor core and a primary processor core of the physical host, wherein the status information comprises first code of the interrupt, the first code of the interrupt indicates a type of the interrupt in a secondary instruction set architecture, and the secondary architecture virtual machine is a virtual machine that supports the secondary instruction set architecture and that runs on the physical host; and obtain second code of the interrupt from an interrupt mapping relationship, wherein the second code of the interrupt indicates a type of the interrupt in a primary instruction set architecture, and the interrupt mapping relationship comprises a correspondence between first code and second code of each type of interrupt among a plurality of types of interrupts, wherein the physical host further comprises a secondary architecture register, and the status information of the interrupt is copied from the secondary architecture register to the shared memory, and the secondary architecture register is a register that complies with a specification of the secondary instruction set architecture and that is configured to store the status information of the interrupt triggered by the secondary architecture virtual machine; and
identify the type of the interrupt based on the second code of the interrupt, and handle the interrupt.

14. The physical host according to claim 13, wherein the physical host further comprises a shared register, and the programming instructions, when executed by the at least one processor, cause the physical host to obtain the status information of the interrupt from the shared register, wherein the shared register is shared by a secondary processor core and a primary processor core, and the shared register stores the status information of the interrupt.

15. The physical host according to claim 13, wherein the physical host further a primary architecture register, the interrupt mapping relationship further comprises a correspondence between the secondary architecture register and the primary architecture register, the primary architecture register is a register that complies with a specification of the primary instruction set architecture;

the programming instructions, when executed by the at least one processor, cause the physical host to: search, based on the interrupt mapping relationship, for the primary architecture register corresponding to the secondary architecture register; and write the second code of the interrupt into the primary architecture register; and read the second code of the interrupt from the primary architecture register, and handle the interrupt based on the second code of the interrupt.

16. The physical host according to claim 13, wherein the physical host comprises a hardware device supporting hardware-assisted virtualization, the hardware device supports the primary instruction set architecture, and the programming instructions, when executed by the at least one processor, cause the physical host to handle the interrupt by using the hardware device supporting hardware-assisted virtualization.

* * * * *